(12) United States Patent
Kirkby et al.

(10) Patent No.: US 7,269,185 B2
(45) Date of Patent: Sep. 11, 2007

(54) MANAGEMENT AND CONTROL OF MULTI-LAYER NETWORKS

(75) Inventors: Paul Kirkby, Harlow (GB); Michael Heffernan, Ottawa (CA); David Ireland, Chelmsford (GB); Peter Hamer, Bishops Stortford (GB); Radhakrishnan Kadengal, Harlow (GB)

(73) Assignee: Nortel Networks Limited, St. Laurent, Quebec (CA)

( * ) Notice: Subject to any disclaimer, the term of this patent is extended or adjusted under 35 U.S.C. 154(b) by 1137 days.

(21) Appl. No.: 09/862,861

(22) Filed: May 22, 2001

(65) Prior Publication Data

US 2002/0097747 A1    Jul. 25, 2002

Related U.S. Application Data

(60) Provisional application No. 60/206,078, filed on May 22, 2000.

(51) Int. Cl.
*H04J 3/16* (2006.01)
*H04J 14/02* (2006.01)
*G06F 15/173* (2006.01)
*G06F 9/46* (2006.01)

(52) U.S. Cl. .............. 370/469; 370/230; 370/395.21; 398/75; 709/226; 718/104; 718/105

(58) Field of Classification Search ......... 370/395.21, 370/230, 469; 379/114.01, 133, 201.01; 455/445; 705/34; 398/75; 709/226; 718/104, 718/105
See application file for complete search history.

(56) References Cited

U.S. PATENT DOCUMENTS 5,623,534 A * 4/1997 Desai et al. ............. 455/445
5,764,740 A * 6/1998 Holender ............ 379/112.05

(Continued)

*Primary Examiner*—Alpus H. Hsu
(74) *Attorney, Agent, or Firm*—Barnes & Thornburg, LLP

(57) ABSTRACT

A communications network has multiple resource-allocation layers and incorporates a management structure for allocating resources to allocate resources requested by a first layer of said layers from a second of said layers. At a first layer, the management structure provides an indication to a second layer of the required resources that are to be allocated from the second layer. The second layer automatically offers the required resource together with a condition for use of those resources. This condition includes a notional price factor which is dependent on current demand. Under the control of the manager, the first layer determines if the condition for use of the offered resources is acceptable and, if so, automatically accepts the offered resources from the second layer. In a preferred embodiment, ingress to an underlying multi-wavelength transport layer of the network is controlled via a virtual port which allocates traffic to real ports one for each wavelength supported by the transport layer.

32 Claims, 19 Drawing Sheets

U.S. PATENT DOCUMENTS

| | | | |
|---|---|---|---|
| 5,848,139 A * | 12/1998 | Grover | 379/114.01 |
| 5,991,300 A * | 11/1999 | Tappan | 370/392 |
| 6,208,977 B1 * | 3/2001 | Hernandez et al. | 705/34 |
| 6,338,046 B1 * | 1/2002 | Saari et al. | 705/34 |
| 6,421,434 B1 * | 7/2002 | Rosu | 379/133 |
| 6,442,258 B1 * | 8/2002 | Mashinsky | 379/114.02 |
| 6,466,559 B1 * | 10/2002 | Johansson et al. | 370/335 |
| 6,542,588 B1 * | 4/2003 | Mashinsky | 379/114.02 |
| 6,625,650 B2 * | 9/2003 | Stelliga | 709/226 |
| 6,631,134 B1 * | 10/2003 | Zadikian et al. | 370/395.21 |
| 6,724,875 B1 * | 4/2004 | Adams et al. | 379/201.01 |
| 6,879,566 B1 * | 4/2005 | Raivio et al. | 370/310.1 |
| 6,928,053 B1 * | 8/2005 | Kadengal | 370/232 |
| 6,937,566 B1 * | 8/2005 | Forslow | 370/231 |
| 2001/0053145 A1 * | 12/2001 | Willars et al. | 370/352 |
| 2002/0048360 A1 * | 4/2002 | Zambre et al. | 379/229 |

* cited by examiner

MANAGEMENT AND CONTROL OF MULTI-LAYER NETWORKS

RELATED APPLICATIONS

This application is the non-provisional filing of Provisional Application No. 60/206,078 filed on May 22, 2000.

FIELD OF THE INVENTION

The present invention relates to a method and apparatus for managing and controlling a communications network and to a network incorporating such apparatus.

BACKGROUND TO THE INVENTION

Communications networks are now delivering a wide range of services to customers and are transporting increasing volumes of both voice and data traffic. Each of these different services has attendant bandwidth and quality of service (QoS) requirements, the latter ranging from the "best efforts" requirement of some data services to the high quality guarantee accorded to voice services. Customers may also, in some instances, pay a premium for a guaranteed quality of service to ensure timely delivery of critical traffic.

Basic economic forces are driving the network operators to require a unified carrier network capable of transporting all foreseen classes of traffic across a commonly managed and controlled physical infrastructure. Similarly for basic cost of ownership reasons network operators wish to use whatever transport technology is the least expensive, yet capable of meeting all the service demands.

An increasing problem with such networks is that of management in order to allocate network resources, particularly bandwidth, in a manner which ensures efficient resource utilisation and maximises the revenue return to the network operator(s).

Traditionally, management is a centralised function involving human decision making. With the increasing complexity of communications networks and the increasing variety of services that is being introduced, the use of human intervention to provide the network management function is becoming increasingly difficult, particularly with regard to the issue of revenue maximisation.

A further problem that has been experienced with multi-layer networks is that of congestion management Congestion in any of the network layers can severely restrict the traffic handling capacity and thus limit the potential revenue return for the network operator.

OBJECT OF THE INVENTION

The invention seeks to provide an improved method, apparatus and software for managing and controlling a communications network.

The invention also seeks to provide an improved methods apparatus and software for resource management in a communications network.

SUMMARY OF THE INVENTION

According to a first aspect of the invention there is provided a method of allocating resources in a network having multiple resource-allocation layers and in which a first layer requires resources provided by a second of said layers, the method comprising the steps of:

at said first layer, providing an indication of said required resources to be allocated from said layer;

at said second layer automatically offering said required together with a price for those resources; and at said first layer automatically determining if the price for the offered resources is acceptable and, if so, accepting the offered resources from the second layer According to a further aspect of the invention, there is provided a method of managing a communications network having a multi-layer hierarchical structure in which each layer of the hierarchy can provide a transport service to one or more other layers, the method comprising negotiating automatically between said layers to determine a network resource allocation and a resource price to be offered to a customer for admission to the network and utilisation of said resource allocation.

According to a further aspect of the invention, there is provided a method of allocating resources in a communications network having a hierarchy of transport layers, each said layer having its own resource capacity, the method comprising: determining within a said layer whether that layer has sufficient resources to support a request for service, and, where insufficient resources are available, automatically requesting further resources from one or more other said layers.

According to another aspect of the invention, there is provided a communications network having a multi-layer hierarchical structure in which each layer of the hierarchy can provide a transport service to one or more other of said layers, and having a management arrangement for negotiating automatically between said layers to determine a network resource allocation and a resource price to be offered to a customer for admission to the network and utilisation by the customer of said resource allocation.

According to another aspect of the invention, there is provided a communications network having multiple resource-allocation layers and incorporating a management structure for allocating resources to allocate resources requested by a first layer of said layers from a second of said layers, the management structure being arranged to perform the steps of:

at said first layer, providing an indication to the second layer of said required resources to be allocated from said second layer;

at said second layer automatically offering said required resource together with a condition for use of those resources; and at said first layer determining if the condition for use of the offered resources is acceptable and, if so, automatically accepting the offered resources from the second layer.

According to another aspect of the invention there is provided a multi-layer communications network, comprising an upper Internet protocol (IP) layer, a multi-protocol label switched (MPLS) layer, a synchronous transport (SDH) layer, and an underlying multi-wavelength optical transport layer, wherein each said layer has a respective manager arranged to manage resources within that layer, to respond to requests for service from other layer managers, to set a price for those service requests, and to request service from the other layer managers, and wherein an interlayer manager responsible for controlling the resource allocation and resource pricing of each said layer manager so as to optimise use of the resources within each said layer.

The invention is also directed to a method by which the described apparatus operates and including method steps for carrying out the functions of the apparatus.

The invention also provides for a system for the purposes of network control and management which comprises one or more instances of apparatus embodying the present invention, together with other additional apparatus.

The arrangement function may advantageously be performed by software provided in machine readable form on a storage medium.

The arrangement and method provide a seamless merging of automatic management and control processes to provide an efficient utilisation of resources for the various network layer and thus provides a means of maximising a revenue return to an operator of the network.

The arrangement effectively provides an internal market within the network from which resources are offered to customers at a prevailing price. This minimises the number of refusals for admission to the network under busy conditions as a customer can be permitted access if he/she is prepared to pay the current premium for admission.

The preferred features may be combined as appropriate, as would be apparent to a skilled person, and may be combined with any of the aspects of the invention.

Advantageously, ingress to an underlying multi-wavelength transport layer of the network is controlled via a virtual port which allocates traffic to real ports one for each wavelength supported by the transport layer. In a preferred embodiment, the number of wavelengths to which traffic is allocated at any one time is determined from a current bandwidth price for access to the transport layer.

The multi-wavelength transport layer may provide supertrunks between ingress and egress points in a manner analogous to inverse multiplexing.

Other aspects and features of the present invention will become apparent to those ordinarily skilled in the art upon review of the following description of specific embodiments of the invention in conjunction with the accompanying figures

BRIEF DESCRIPTION OF THE DRAWINGS

In order to show how the invention may be carried into effect, embodiments of the invention are now described below by way of example only and with reference to the accompanying figures in which.

DESCRIPTION OF PREFERRED EMBODIMENTS

Figure 1:
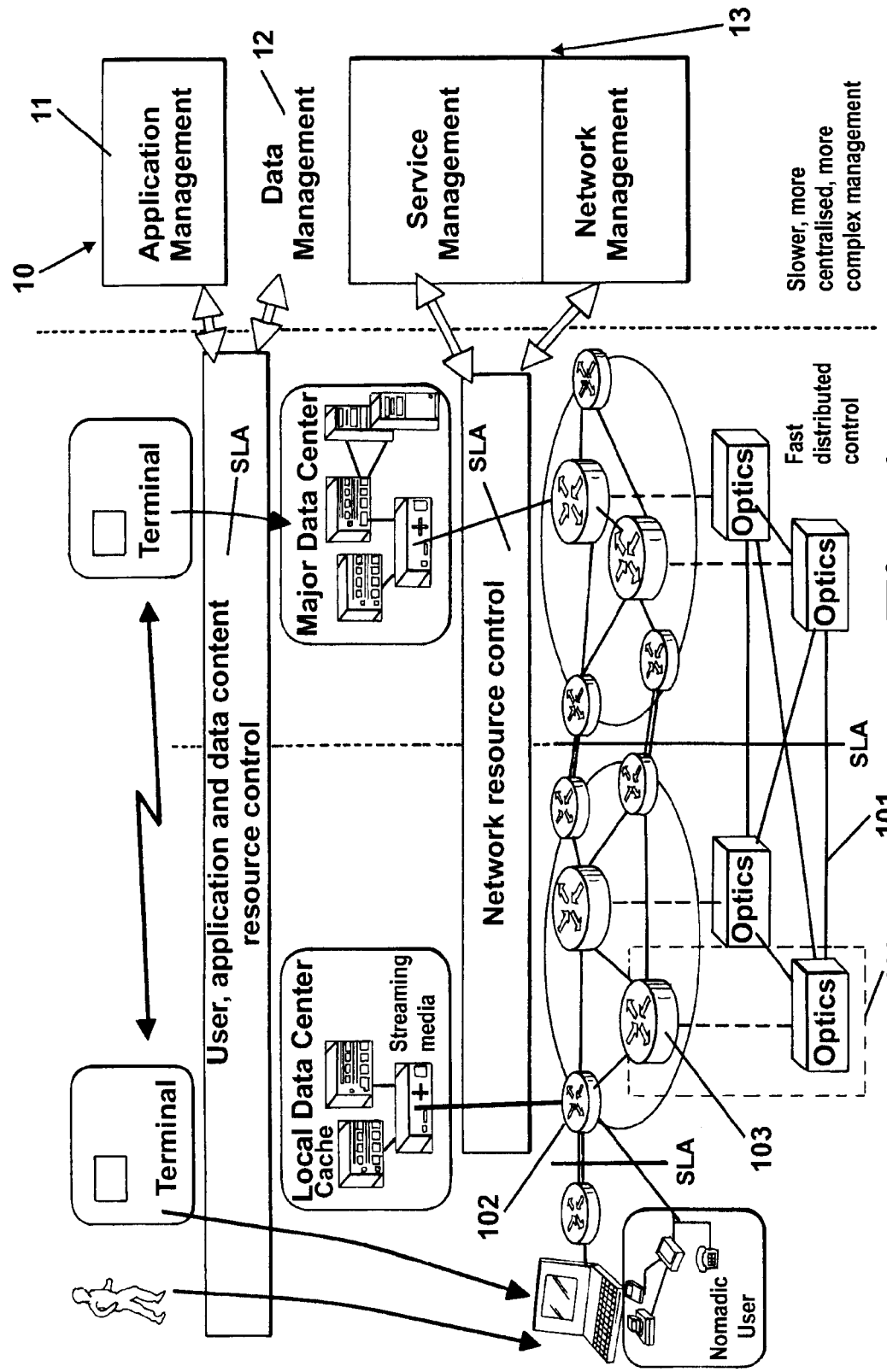
FIG. 1 shows an exemplary network management and control assignment in schematic form.

Referring first to FIG. 1, this shows in schematic form a high level view of the architecture of the network management and control systems. The management system 10 depicted in FIG. 1 is hierarchical with high level application (11) and data (12) management services built upon lower level transport services (13) which in turn are provided by network and link level transmission services. For scalability and response speed it is desirable that the high speed control aspects are physically distributed across the network, whilst more longer term management aspects can be more centrally monitored and managed. User access is provided via terminals 15.

The network of FIG. 1 incorporates an underlying optical transport or lambda switched layer 101 supporting a network of nodes 102 and core nodes 103. It will be understood that the optical transport layer may carry traffic on a plurality of optical wavelengths in a wavelength division multiplex (WDM) arrangement. The structure of a core node arrangement indicated as 100 in FIG. 1 will be described with reference to FIG. 2 below.

The network of FIG. 1 incorporates photonic switch matrices with port counts of hundreds and switching times of 10 s of milliseconds.

Figure 2:
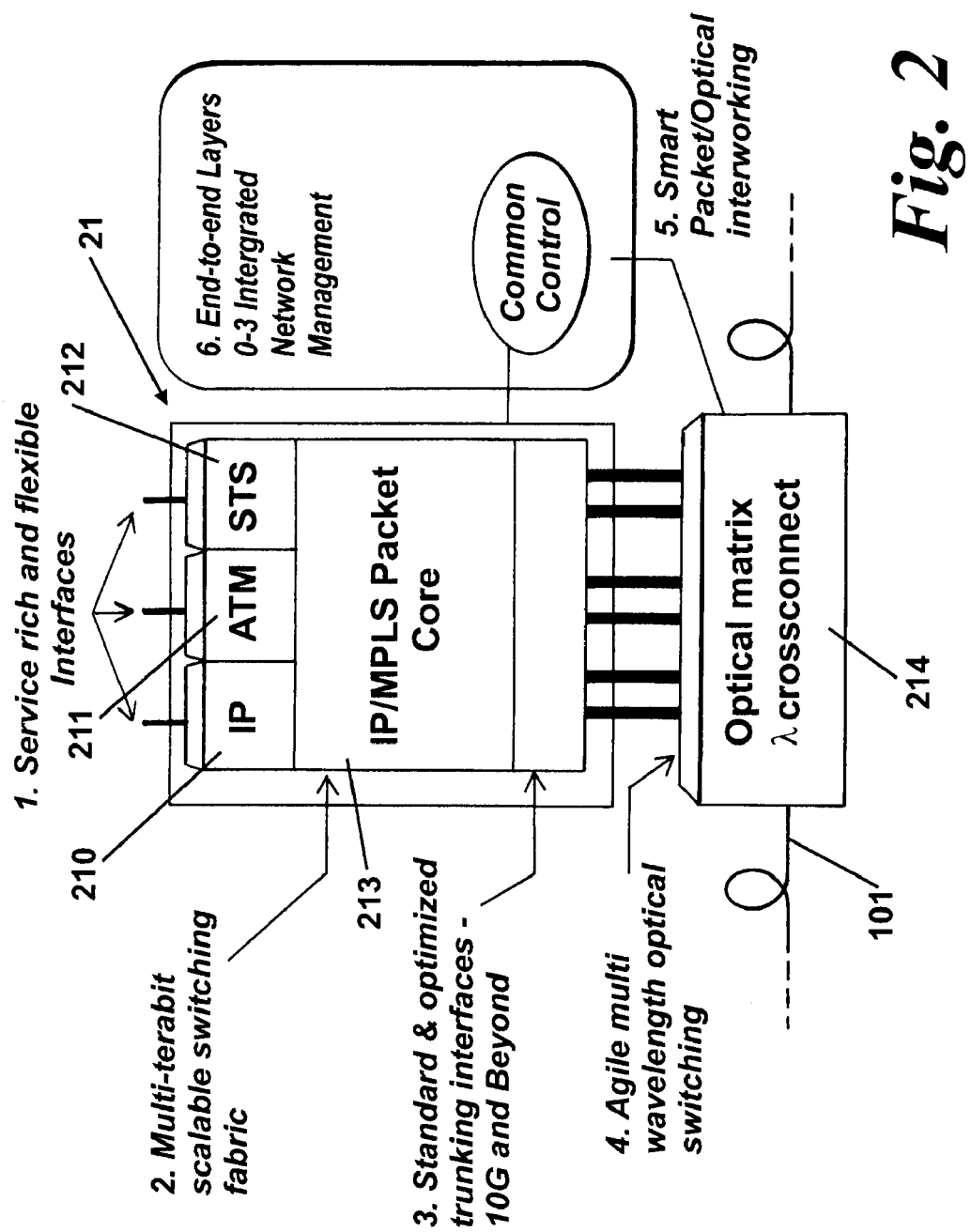
FIG. 2 shows a core node used in the network of FIG. 1.

FIG. 2 illustrates a hybrid photonic/electronic terabit capacity router that may be employed as a core node in the network of FIG. 1. This arrangement minimises the use of expensive optical to electronic transmitters and receivers for all traffic transiting the router.

FIG. 2 also summarises the main features of the core nodes of the unified carrier network of FIG. 1. The core terabit router, generally depicted as 21, uses IP and/or MPLS as appropriate to transport all service types. These service types are illustrated as IP (210), ATM (211) and STS (212) services in the diagram. These services enable carrying of highly aggregated streams of traffic. The router IP/MPLS packet core 213 provides a multi-terabit scalable switching fabric. The router 21 interfaces to an optical matrix lambda cross-connect 214 which provides agile multi-wavelength optical switching.

In the network of FIG. 1, we provide a scaleable and efficient method of controlling and optimising both the overall resource usage and the resource usage within each layer. The mechanisms employed are capable of being organisationally unbundled, so that different business organisations can run a particular layer or part layer. Advantageously the unbundled interfaces enable some form of meaningful metering so that there is a rational basis for inter-domain settlement if the business organisations are financially independent. The network operator(s) can then deliver the best service for the minimum resource despite unpredictable and rapidly changing demand patterns.

Figure 3:
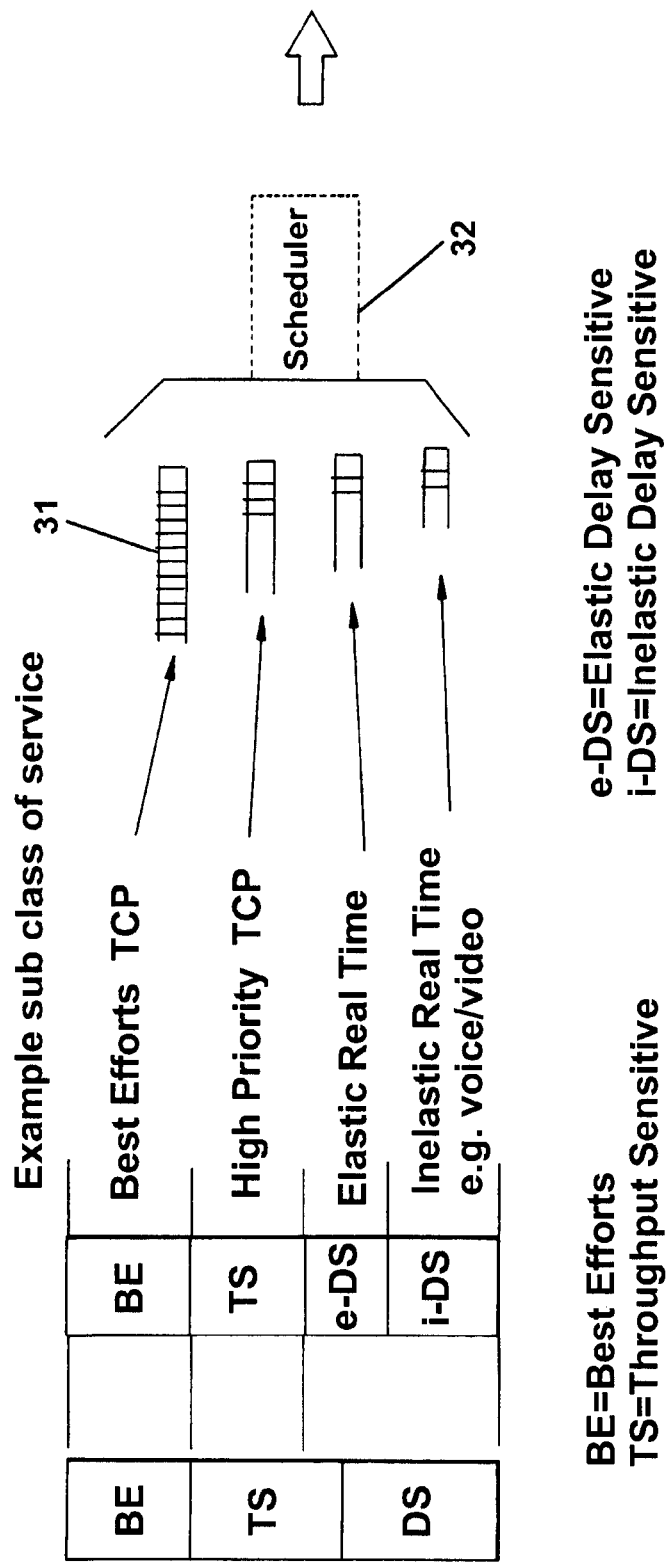
FIG. 3 illustrates generic service types.

FIG. 3 illustrates three generic classes of traffic that are permitted in the core network of FIG. 1. We have found that all other traffic service types can be delivered with close to optimal resource usage efficiency using these core transport services providing there is suitable interlayer adaptation at each domain boundary, and suitable ingress control at the network edge and/or in the end user host. FIG. 3 shows these major service types which comprise best efforts (BE), throughput-sensitive (TS) and delay-sensitive (DS) The delay-sensitive traffic comprises elastic real time traffic, and inelastic real time traffic such as voice or video. The characteristics of these service types are summarised below.

Best Efforts traffic is traffic that has no guarantees. A good example is user datagram packets transmitted over the IP network layer. When excessive best effort traffic attempts to pass through any of the network resources, then packets are first delayed in buffers, then if that is insufficient, packets are dropped. The end user has no grounds for complaint in this case as the service type has no guarantees. The end user is in principle able to transmit information at whatever bandwidth he wishes, many applications however respond to network resource utilisation indicator (RUI) signals to dynamically control transmission rate. Any traffic type that responds to RUI signals by reducing transmission rate when the RUIs indicate increasing network congestion is known as elastic traffic. The most widespread example is the use of packet loss RUIs which occur naturally with router port overflow, signalled back to the source application by acknowledgement return. The source host then uses the TCP/IP protocol stack to control transmission rate (and retransmit any missing packets). Another good example of elastic traffic is ATM-ABR traffic. This uses RUI signals added into resource management cells as they transit the ATM switches to control source transmission rate. The benefit to the end user in such elastic applications is the ability to make maximum use of network resources without overloading them.

The Throughput Sensitive class of service is an improved class of service for traffic that is not delay sensitive. High priority TCP trunking services and assured service "Diffserv" class of service are typical examples of this. They are also elastic services; however the aim is to give the end user a higher transmission rate than best efforts traffic in any given congestion conditions. This means that the instantaneous bandwidth of the traffic, although higher per end-user than the best efforts class of traffic, still needs to be managed and/or controlled avoid network congestion. The instantaneous bandwidth of TS traffic is thus constantly varying as the end user adapts rate in response to his own demand and RUI signals fed back from the network.

The Delay Sensitive class of traffic includes all interactive voice and video service types. Usually individual user delay sensitive traffic streams are inelastic as in traditional voice services. That is to say the end user prefers a pre-signalled admission control mechanism with a fixed bandwidth availability that is guaranteed once admission is granted. Delay Sensitive traffic may however be elastic, for example when the voice or video coding is adaptive to network congestion signals in such a way as to reduce bandwidth requirements when there is high congestion. Each of these generic service types can be provided with various degrees of protection and restoration.

Higher level services such as VPN services can be made up by building a network of managed paths interconnecting routers and using these generic transport service types.

The different transport layers are not all equally capable of carrying all transport service types. There are historical and technology dependent restrictions. For example, the SDH/SONET layer can by definition only directly carry point to point inelastic traffic of pre-specified bandwidths corresponding to the virtual container sizes of the Synchronous Digital Hierarchy, although it can of course carry elastic traffic streams within these virtual containers (e.g. Packet over SONET or MPLS over SONET).

The four transport layers that are particularly advantageous in our arrangement and method are the SONET/SDH layer, the lambda switched layer, the IP layer and the MPLS layer. The basic transport service requirements and the capabilities that these four transport layers possess, or can soon be expected to possess, are summarised in the following diagram of FIG. 4 and in Tables 1 and 2.

Figure 4:
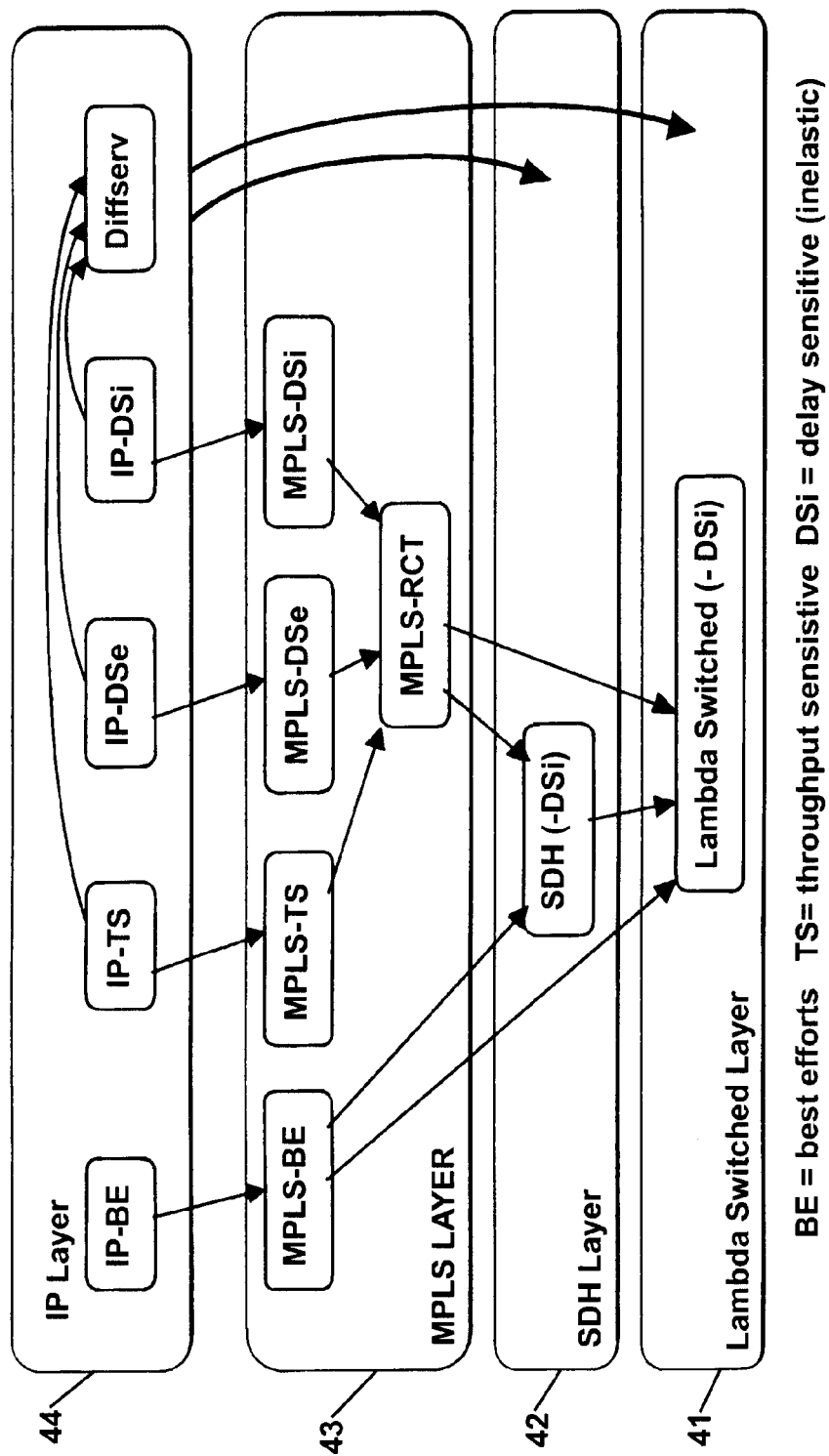
FIG. 4 is a service entity relationship diagram.

FIG. 4 shows the basic service entity relationship diagram, and indicates which services can use which other service in the multi-layer transport architecture of FIG. 1. For clarity, FIG. 4 shows only the main options for one service type using another. Each service entity could provide an end user service in its own right, Any IP layer service needs some form of connectivity service to link routers The arrows linking the IP layer 44 to either the lambda layer 41 or the SDH layer 42 indicate two possibilities. Both these latter layers are only capable of providing fixed bandwidth point to point links. A particular service type referred to in FIG. 4 is the MPLS resource controlled trail. This is a managed path that continuously signals resource utilisation indicator (RUI) signals in some form to the ingress controller of the path. It is a generic service type capable of delivering and ingress controlling all high quality of service transport requirements.

For delivering higher QoS IP services, we employ either Diffserv or an MPLS service When using Diffserv there is no need to use any different form of connection between routers. A preferred controlled alternative for delivering both elastic and inelastic, throughput and delay sensitive services is to use appropriate MPLS services. The diagram of FIG. 4 shows how the MPLS resource controlled trail service can deliver all the higher QoS services required for Unified Packet transport layers. With appropriate adaptation, any data transmission type could use one of these services whether the traffic originates as IP, ATM, Frame Relay etc.

The following two tables (Table 1 and Table 2 below) summarise the service requirements and the other main operator requirements for the exemplary network of FIG. 1. In Table 2 the difference between protection and restoration is that protection is an automated process that switches routes to avoid a failed element. The pre-planned stand by route is always ready and is guaranteed available for immediate use by the switched traffic. Restoration is a process whereby alternate routes are not pre-planned and guaranteed; they are found after the failure occurs by searching for alternative routes that are currently under used. The difference in algorithmic complexity and signalling update rate explain why protection can occur in typically 50 mS (e.g. SDH rings) and restoration often takes up to 30 sec (e.g. in IP networks). Trail monitoring capability refers to a characteristic typical of SDH systems today whereby resources used along a managed paths (trails) are constantly monitored for correct functionality. Alarms are sent up through the management system if there are failures.

TABLE 1

Table 1 Capability of each layer to carry the generic service types

|  | IP Layer | MPLS Layer | SONET/SDH Layer | Lambda Switched Layer |
|---|---|---|---|---|
| Best Efforts | Yes | Yes | Indirect e.g IP/SONET | Indirect e.g. IP/SONET/Lambda |
| Throughput Sensitive (elastic) | Indirect e.g. IP/MPLS-RCT or Diffserv | Yes e.g. MPLS-RCT | Indirect e.g. MPLS-RCT/SDH | Indirect e.g. MPLS-RCT/SDH/Lambda |
| Delay Sensitive (Inelastic) | Indirect e.g. IP/MPLS-RCT or Diffserv | Yes | Yes | Yes |

TABLE 2

Table 2 Basic protection, restoration and monitoring capabilities of each transport layer

|  | IP LAYER | MPLS LAYER | SONET/SDH LAYER | LAMBDA SWITCHED LAYER |
|---|---|---|---|---|
| Restoration capability (e.g. 30 sec) | Yes | Yes | Yes-tends to be manually supervised today | Yes |
| Protection Capability (e.g. 50 mS) | No, (debatably a fundamental limitation) | Yes | Yes in use | Yes |
| Trail monitoring service capability | No | Yes-for explicitly routed MPLS LSPs | Yes | Yes |

Figure 5:
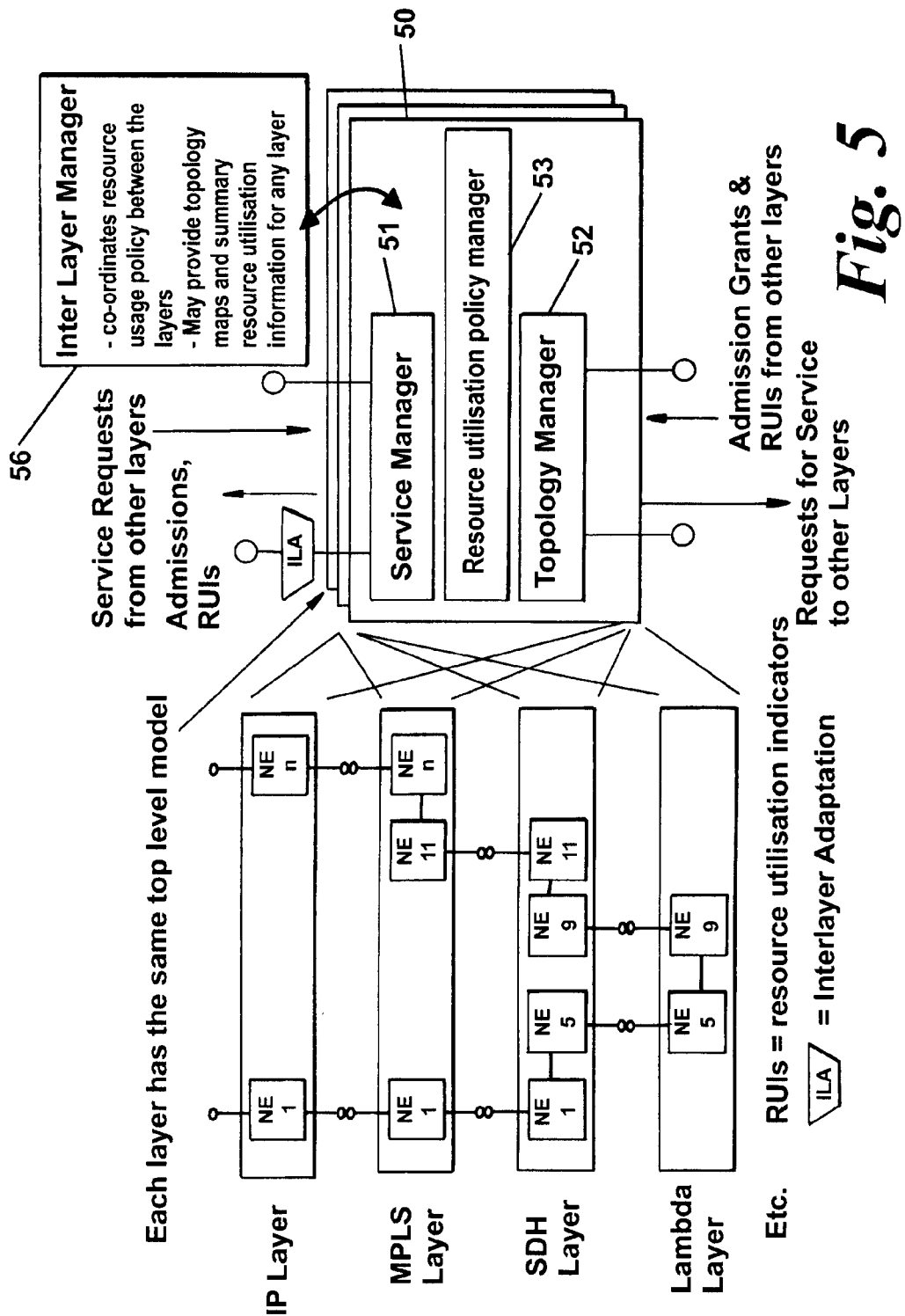
FIG. 5 shows a preferred multi-layer transport architecture of the network of FIG. 1.

An exemplary multilayer transport architecture is illustrated in FIG. 5. In the architecture of FIG. 5 each layer can provide a transport service to other layers via an appropriate interlayer adaptation function. This diagram however is not restricted to point to point links. The traffic may also flow on multicast trees or many to one topology connections. The traffic may also be connection oriented with explicit routing or connectionless like IP traffic. In addition, there is a congestion signalling mechanism for signalling the path 'resource utilisation indicator' to the layer using the service. In the MPLS-RCT layer the RUI signalling mechanism will use resource management packets or congestion indication marks. Such systems have the major advantage that they can dynamically control all classes of traffic from the carrier edge nodes in such a way that no buffer flow ever occurs in the core network. This enables the aggregation and control of all high priority traffic in the core using a common control mechanism that can be used irrespective of the core network transmission and switching technology. So for instance as illustrated in FIG. 5 traffic can be aggregated in the IP layer and flow over explicit MPLS-RCT paths that in turn are aggregated to flow over SDH paths that in turn are multiplexed on to particular wavelengths in the lambda switched or multi-wavelength transport layer.

FIG. 5 also shows that each layer has a management system 50 comprising a service manager 51, a topology manager 52 and a resource utilisation policy manager 53. The term manager as employed herein refers to the combination of human and delegated high speed automated mechanisms that control a particular function of the transport layer. For clarity, only one layer management system has been depicted in FIG. 5.

In FIG. 5, the service manager 61 handles requests for service from end users or other layers, agrees bandwidth and QoS, and implements and assures service level agreements by controlling ingress traffic and monitoring the service. The topology manger 52 is responsible for all aspects of routing, discovery of resources, passing on requests to other layers etc. The resource utilisation policy manager is responsible for the policies that determine how resource utilisation indicators are set in any particular situation and traffic demand pattern. The resource utilisation indicator is then used by the service manager 53 for controlling admission, and by the topology manager for determining routing. The network of FIG. 5 also incorporates an interlayer manager generally depicted in 56. This interlayer manager co-ordinates resource usage policy between the layers and advantageously provides topology maps and summary resource utilisation information for any of the layers.

The resource utilisation indicators (RUIs) convey a measure of n-price, This is an internal network control metric that is similar to 'congestion price' or 'shadow price'. This form of RUI increases numerically as the resource utilisation increases. The advantage of using such n-price RUIs, rather than for instance simply a measure of spare available bandwidth on a particular path is that this variable can be used for control differentiated priority elastic traffic and prioritised inelastic traffic classes in a common manner. Thus, using this method, optimised automated admission control decisions can, for example, be made about admitting a new inelastic traffic stream, even when the path appears full of elastic traffic. If the inelastic traffic stream has a sufficiently high priority (as defined by an ingress control 'utility function' under control of the service manager), then it will be admitted and the elastic traffic will be squeezed to compensate as a direct result of the n-price increasing.

The interlayer manager 56 shown in FIG. 5 is responsible for controlling the policies used by the policy managers of each layer so that the overall effect of the system is to continuously approximate to optimum use of the resources on each layer. This is irrespective of the resources available and the traffic demand pattern at the time. In the n-price controlled system proposed here this is achieved by policy based control of the precise 'utility functions' applied to incoming traffic streams, and the algorithms used to set n-price at the resources such as router output ports. The particular advantage of this system compared to, for instance, an interlayer manager with more direct control of resource usage, is scalability. Decisions concerning ingress control and routing can all be delegated and distributed to the local ingress control and topology control subsystems of each layer. The resource utilisation indicator information can, in the limit, be determined in close to real time by locally monitored probe packets sent along the paths. Alternatively a 'layer 4+ middleware' solution can be used. There is no necessity for a centralised entity that makes all the decisions.

As an aid to understanding how to overall system operation we consider each transport layer as a self contained managed economy that uses network resource tokens to convey resource utilisation information. Each link has a congestion dependent n-price. Path prices can be found by adding the link prices along the path. The resource utilisation manager controls the way the automatic ingress control and router port n-price algorithms interact in such away as to ensure resources never get overloaded. In that system, congested links show up as links with high n-prices. Either distributed or more centralised routing mechanism can then adjust the routing tables on a per microflow basis to carry out load balancing. This operation should preferably be carried out with a slow fairly heavily damped mechanism to avoid route flap.

Figure 6:
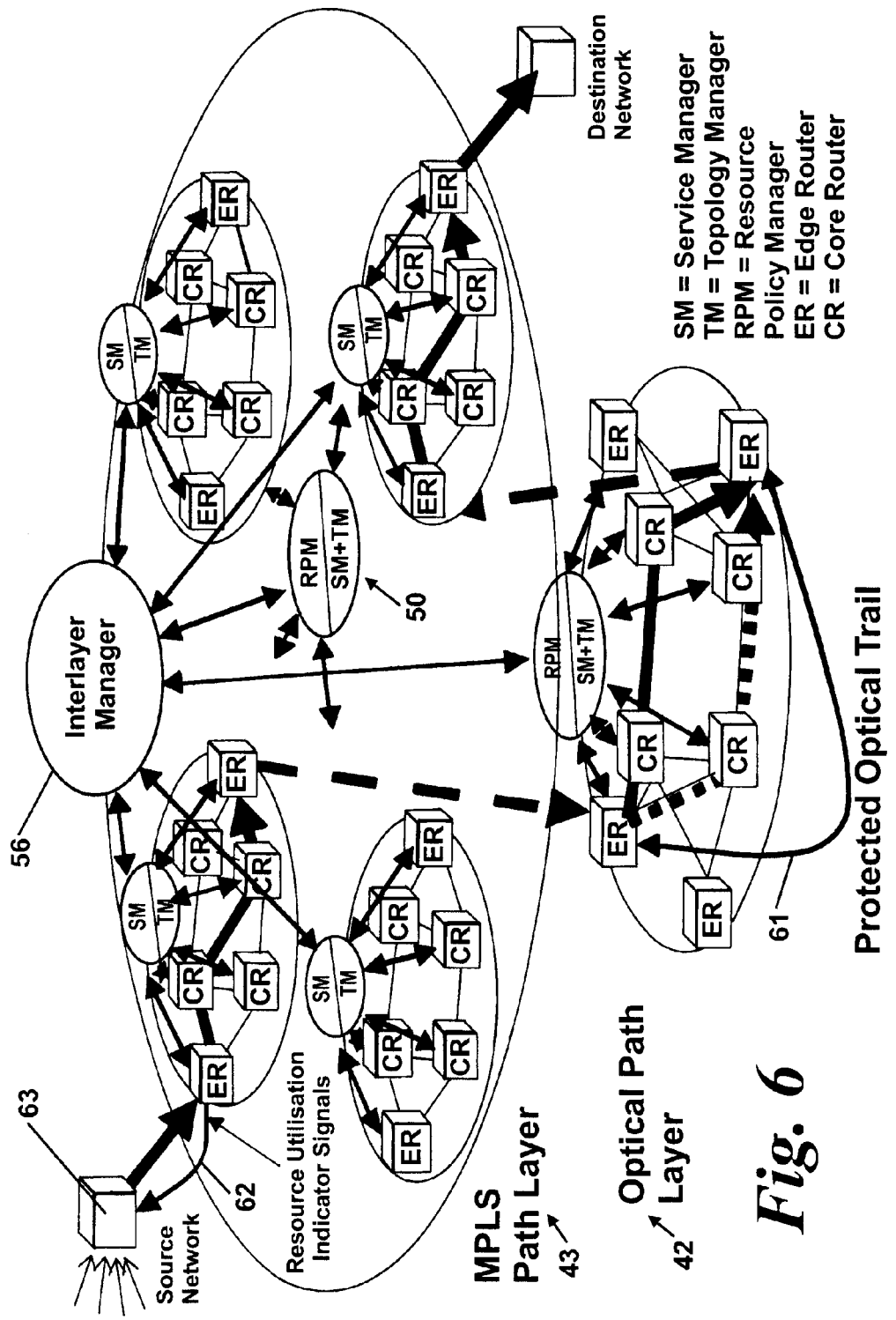
FIG. 6 show a method of distributing management and control functions in two layers of the architecture of FIG. 5.

The above process is carried out independently on each layer under the control of each layer's own resource utilisation manager. As in SDH, networks the individual layers will contain semi autonomous subnetworks linked hierarchically to the overall management and control of that layer as illustrated in FIG. 6. If the topology manager of a layer finds that it cannot meet a service request, or that the n-price along particular paths is becoming excessive, then it may choose to request additional resources from other layers. It is the aim of the overall architecture that the topology manager can make such decisions locally simply by comparing the offered n-price of the service providing layer with his own internal n-price. This enables the function to become fully distributed. It is the job of the interlayer manager 56 to ensure that, to an adequate approximation, decisions made on the basis of comparing n-price between the layers are close to optimal from an overall business perspective. The interlayer manager 56 achieves this by having overall control of the policies employed by the per layer resource utilisation policy managers and/or control of the 'exchange rates' of n-price tokens between the different layers. Each layer can then decide whether to use services from another layer by using a fully distributable n-price-based decision making process.

A particular advantage of the architecture is that it enables traffic value based routing and protection switching decisions to be made. If routing decisions are made on the basis of measurement of traffic volume and their effect on resource utilisation, it is essential that large volumes of low value traffic do not disturb the optimum shortest path routing of high value traffic. The use of policy based utility functions for ingress control of all types of traffic ensures that only the approved volume of traffic is on the network at any one time. The n-price necessary to ingress control the traffic always relates to the value of the traffic as specified by the network operator's ingress control policies. Thus automatic routing decisions based on the minimisation of n-prices will automatically optimally route the traffic according to its value.

For the highest response speed protection switching of high priority traffic, it is advantageous to assign alternate stand-by paths that enable the marked protected traffic to be re-routed within a few milliseconds of a link or node failure being detected at an earlier routing node. A protected optical trail 61 providing this function is illustrated in FIG. 6 which illustrates the distribution of management and control functions in the MPLS path layer 43 and the optical path layer 42. To avoid high priority traffic being lost, we advantageously use the n-price mechanism to ensure that, whatever failures occur, the total of protected traffic passing through any resource does not exceed the resource capacity. This is managed by the use of pre-set control levels for the protected traffic. For instance if typical pre-set control levels for the high priority protected classes of traffic are set to somewhat less than 50%, then any one link's traffic can be routed onto another link without overload. We have found that the DRC n-price mechanism described herein can control traffic to within a margin of a preset control level and that the system responds effectively to sudden unexpected surges of uncontrolled new traffic. Other lower classes of traffic may of course be squeezed into buffers or discarded in this circumstance. Once such a switching event has occurred, the n-price in the link to which the protected traffic has suddenly been switched is increased very rapidly, preventing admission of any new inelastic traffic and squeezing the bandwidth down of all the elastic traffic. In FIG. 6, these n-price signals are passed back (62) to the original network ingress 63 where, for instance, aggregated high priority TCP traffic can be rapidly throttled. This mitigates the effect of the failure in a few path round trip times. (e.g. tens of ms to seconds). The locally high n-price is then used by necessarily slower and more complex routing algorithms to determine how best to re-route traffic to restore the best possible overall service. This corresponds to the lowest uniform n-price averaged over time-scales of say 10s of seconds or whatever damped time-constant is put on the routing control algorithms.

Figure 7:
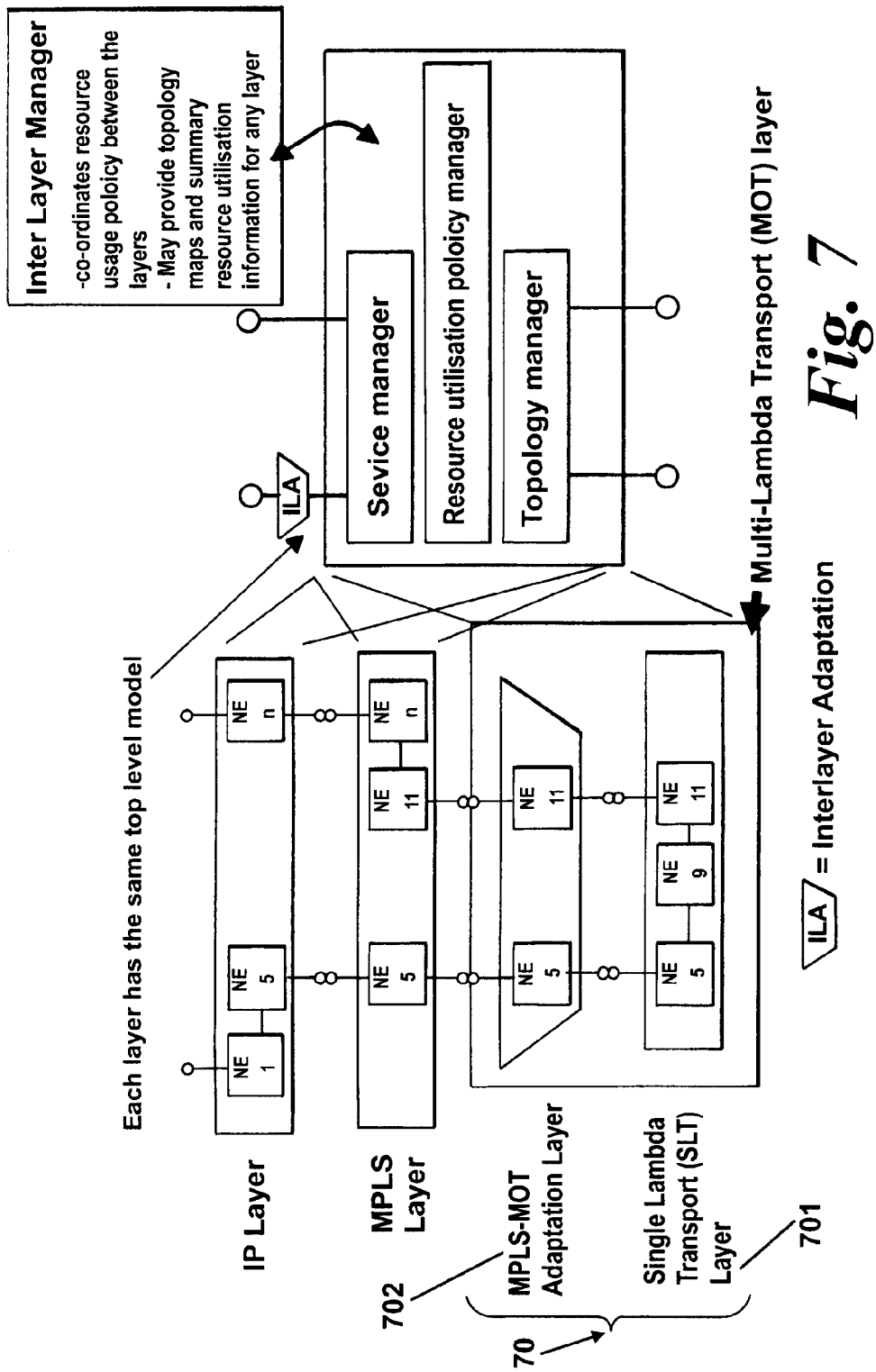
FIG. 7 shows a management model of IP/IMPLS/DML operational architecture for the network of FIG. 5.

Referring now to FIG. 7, this shows a management model of IP/MPLS/DML operational architecture for the network of FIG. 5. The exemplary operational architecture shown in FIG. 7 comprises three layers (four with the adaptation layer). The optical layer 70 has the capability to carry dynamically varying capacity multiple lambda traffic paths between the ingress and egress ports of the network. The overall transport layer is referred to a multiple-lambda optical transport layer (MOT) layer. Similar techniques could be applied to for instance the automatic control and management of the dynamic provisioning of multiple SDH paths.

The MOT layer 70 is comprised by a single lambda transport (SLT) transport layer 701 and an MPLS to MOT adaptation layer 702. The ingress side of the adaptation layer 702 carries out the functionality of multiplexing multiple incoming IP and MPLS traffic flows on to groups of single wavelength transmission paths. The single wavelength transmission paths taken together form a single multi-lambda transmission path from one ingress port to one egress port of the MOT layer. The SLT paths do not all have to follow the same physical path; in fact in general they will be diversely routed for load balancing and protection switching purposes. The arrangement can be used to provide supertrunks between ingress and egress points in a manner analogous to inverse multiplexing.

Figure 8:
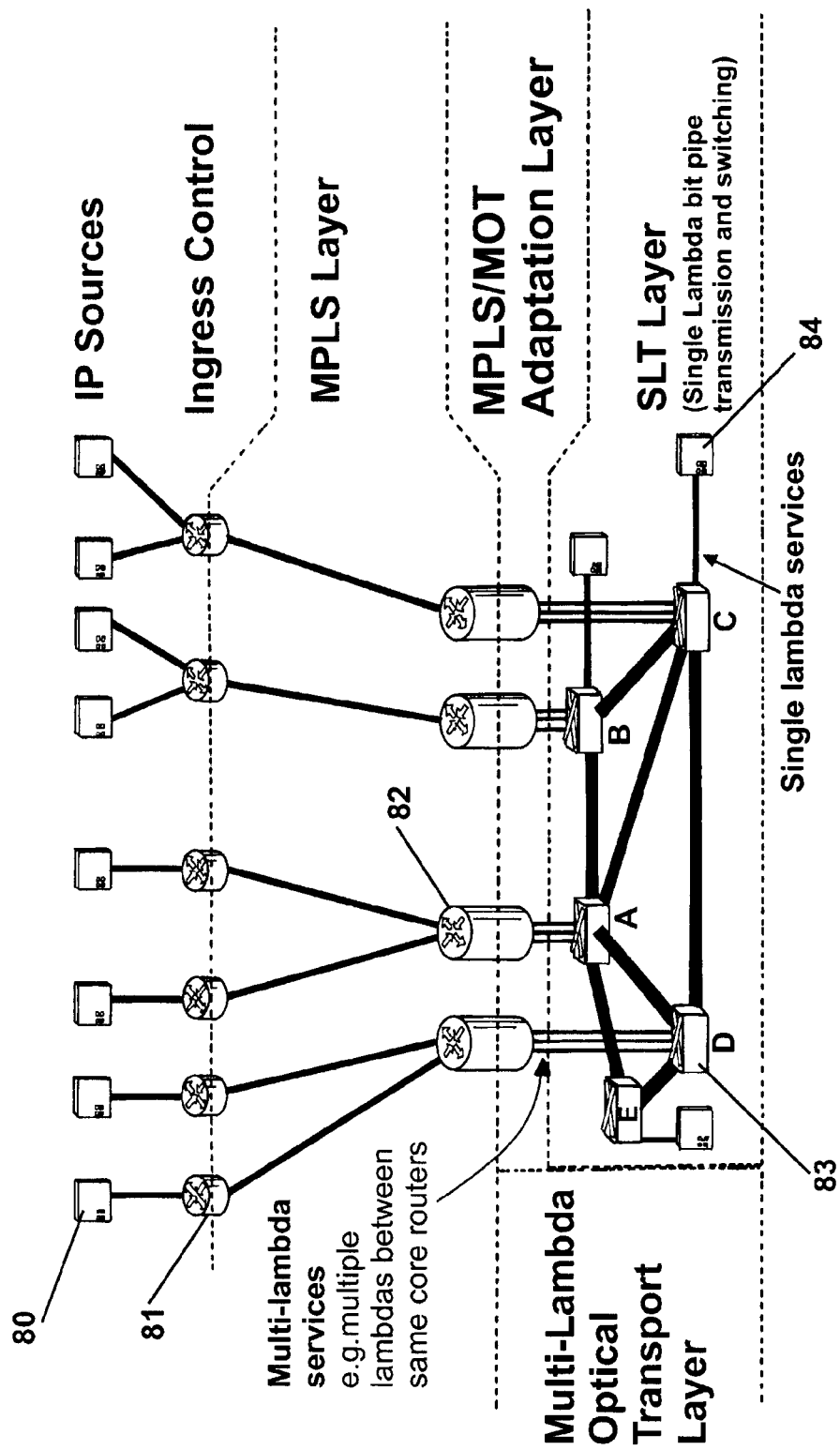
FIG. 8 shows the MPLS/MOT adaptation layer and illustrates the physical mapping of the layered network structure of FIG. 7 on to network elements.

An exemplary physical mapping of the layer structure onto the network elements is shown in FIG. 8. The edge routers 81 form the IP/MPLS interface. These edge routers 81 carry out all the IP traffic classification and forwarding to appropriate MPLS paths. They also carry out value based ingress control. Traffic is then transported by routers that are within the IP and MPLS layers. Traffic destined for the core transport network is directed to 'core routers' 82. These core routing nodes 82 are associated with optical switched routers 83 which correspond to photonic or opto-electronic cross-connect switches.

The MPLS to MOT adaptation process takes place in the final forwarding parts of the core router 82 just prior to the output ports. Note that the diagram of FIG. 8 also shows single lambda transport ports 84 within the SLT layer carrying for instance lambda on demand services which in turn may be carrying for instance SDH traffic.

Figure 9:
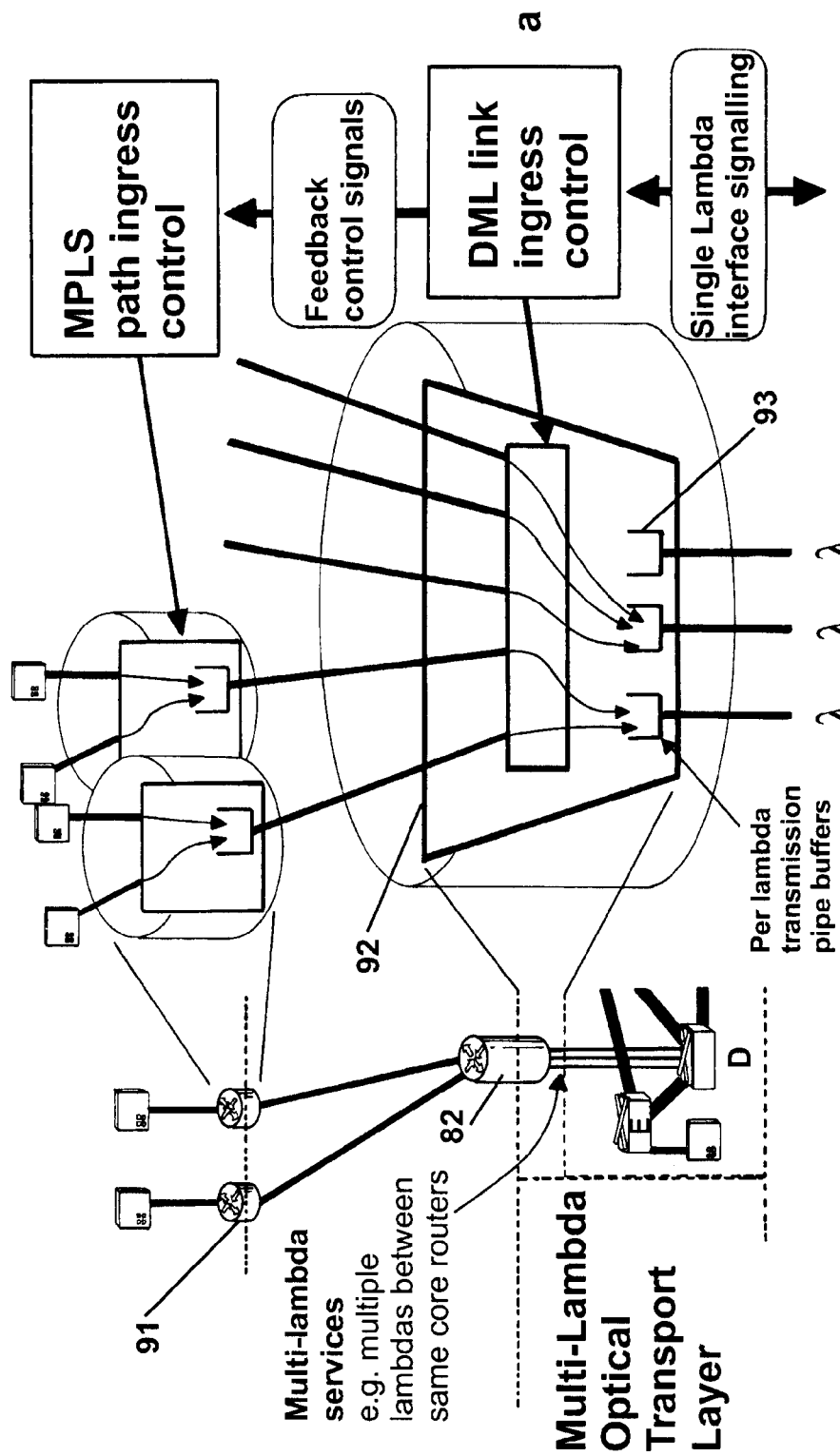
FIG. 9 illustrates the provision of a dynamic multi-wavelength optical transport service.

FIG. 9 shows the key aspects of a transmission service referred to herein as a dynamic multi-lambda (DML) optical transport service. High priority IP traffic is aggregated on to MPLS paths in the edge routers 91 which comprise label edge routers (LERs). At the MOT layer ingress port 92, which is a group of egress ports of the core router, all the IP and MPLS traffic that is destined for a remote core router (an egress port of the MOT layer) is aggregated at a MOT ingress port. The MOT ingress port is a virtual port within the core router 82 feeding a set of physical single lambda ports. The MOT virtual port controls the forwarding paths of all the ingress IP and MPLS traffic feeding this DML path. It directs the ingress traffic towards the appropriate physical SLT ports as shown in FIG. 9.

In the control plane The DRC paradigm is applied to deliver the required QoS to every traffic flow. The system ensures that under no circumstances will delay sensitive traffic ever encounter significant delay at the ingress buffers of the SLT paths. This is achieved by metering the packet traffic into the STL ports. If there are for example three SLT ports on this particular DML paths then the MOT port forwarding engine ensures that incoming traffic is shared amongst the SLT ports in such a way as to avoid any individual SLT port being overloaded with delay sensitive traffic. To achieve this it is of course essential that the total incoming delay sensitive traffic destined for this DML link never exceeds the aggregate DML link capacity. The total incoming delay sensitive traffic is therefore compared to a control level set safely below total DML link capacity and a 'feedback price' control signal is generated. This is passed back up into the MPLS layer where it is added to all the other MPLS link prices on the end to end MPLS path for control of the MPLS flows destined for this MOT port.

In addition to this QoS control functionality the MOT port ingress controller is responsible for protection switching of the protected classes of traffic between SLT ports in the event of SLT path failure, and 'seamless' transfer of traffic to different SLT ports when instructed by the SLT layer.

Figure 10:
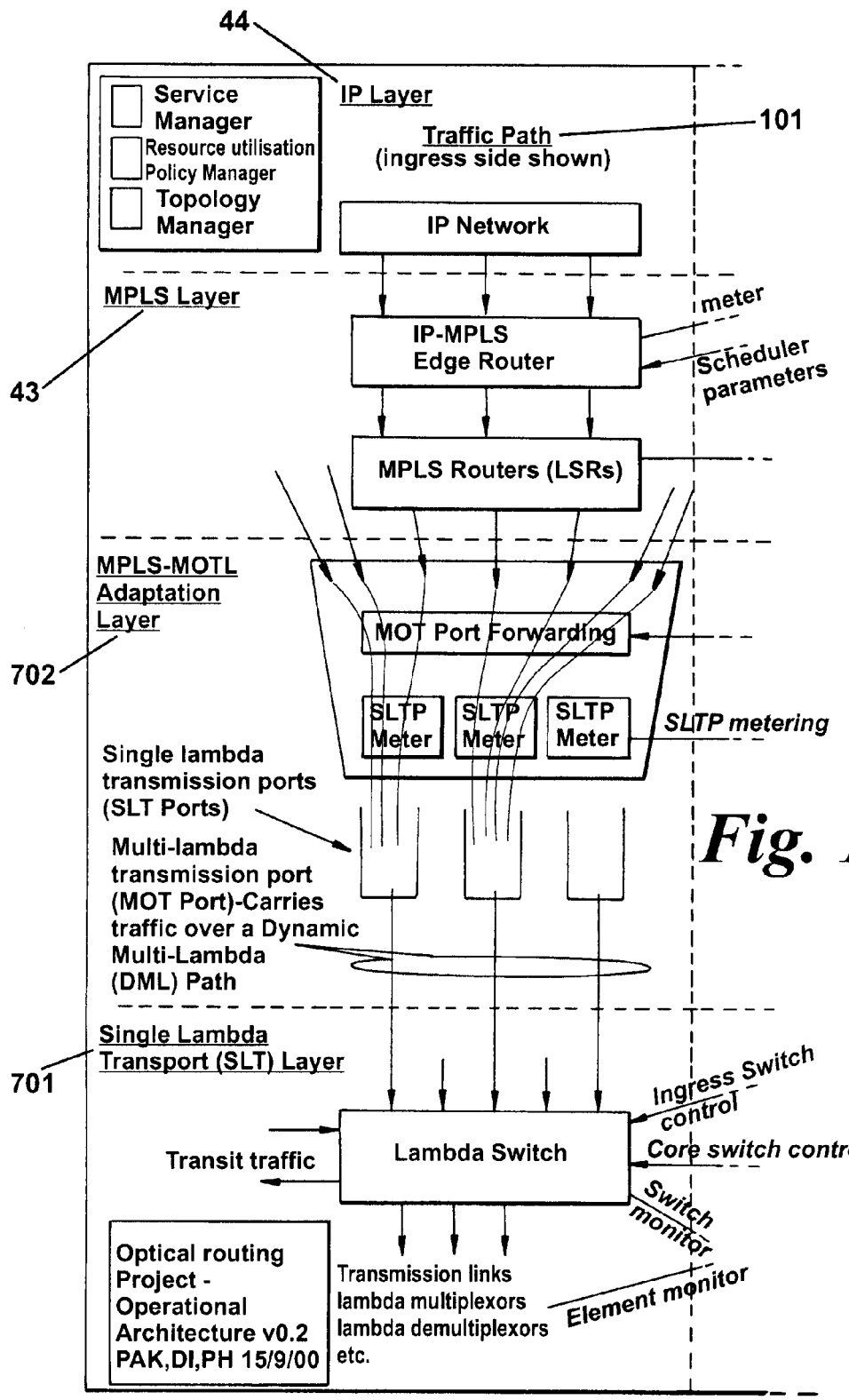
FIG. 10 shows the operational architecture of the network of the management model of FIG. 7.
Figure 10:
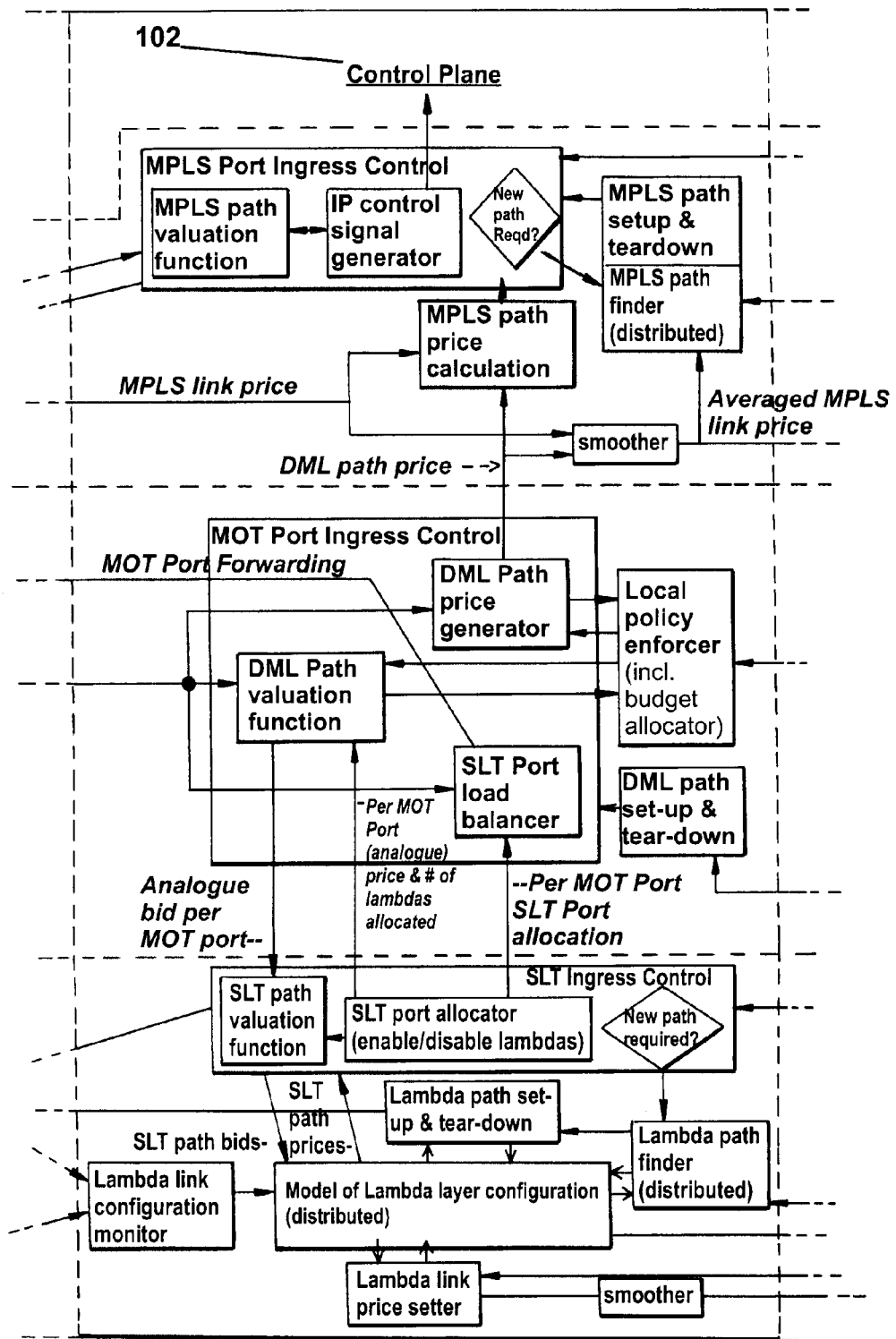
Figure 10:
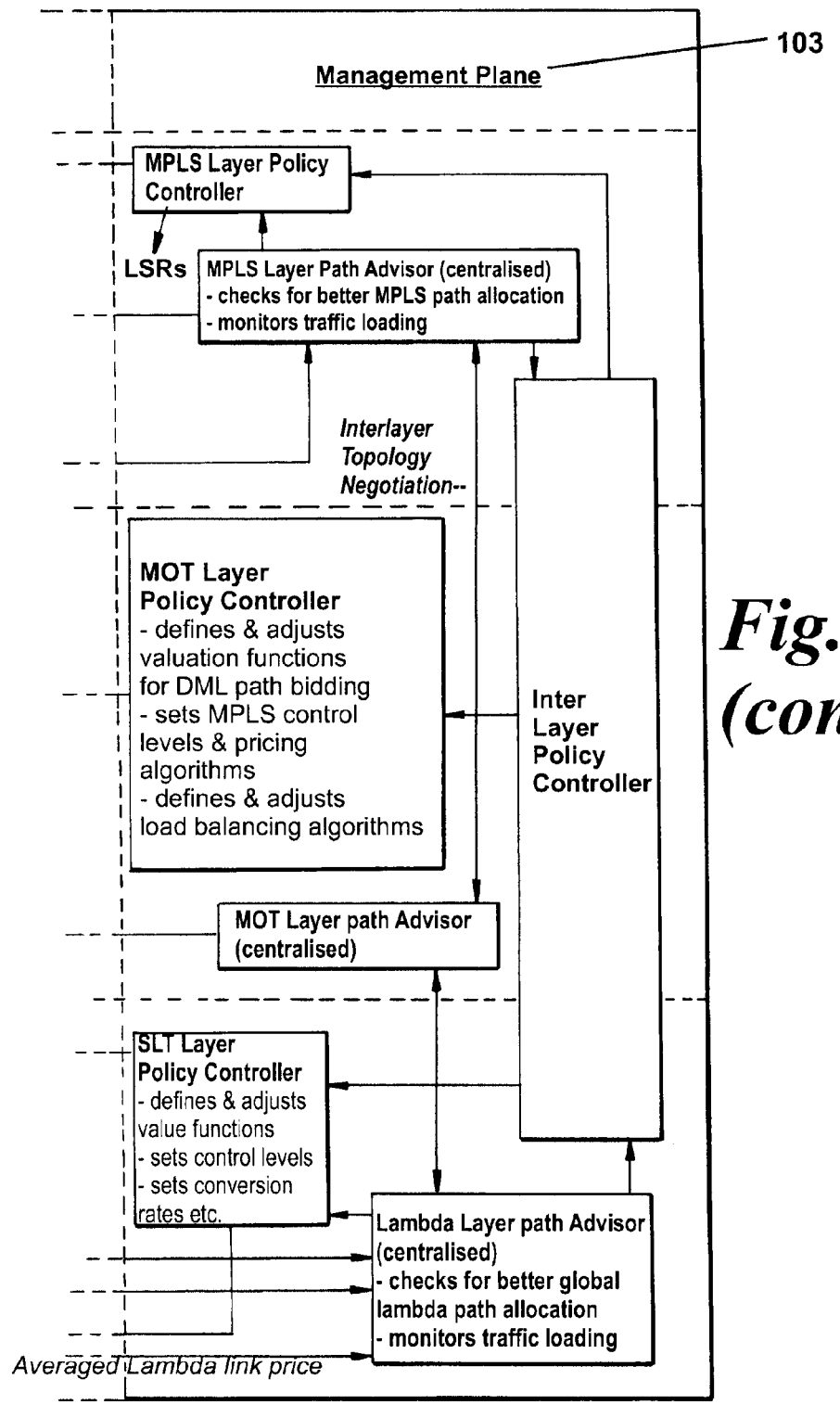

FIG. 10 shows a general schematic diagram of the operational architecture at the next level of detail down. The functionality of the architecture is depicted by being broken down in a matrix form with separation into horizontal transport layers. The traffic plane, the control plane and the management plane are separated to form separate planes vertically.

Figure 11:
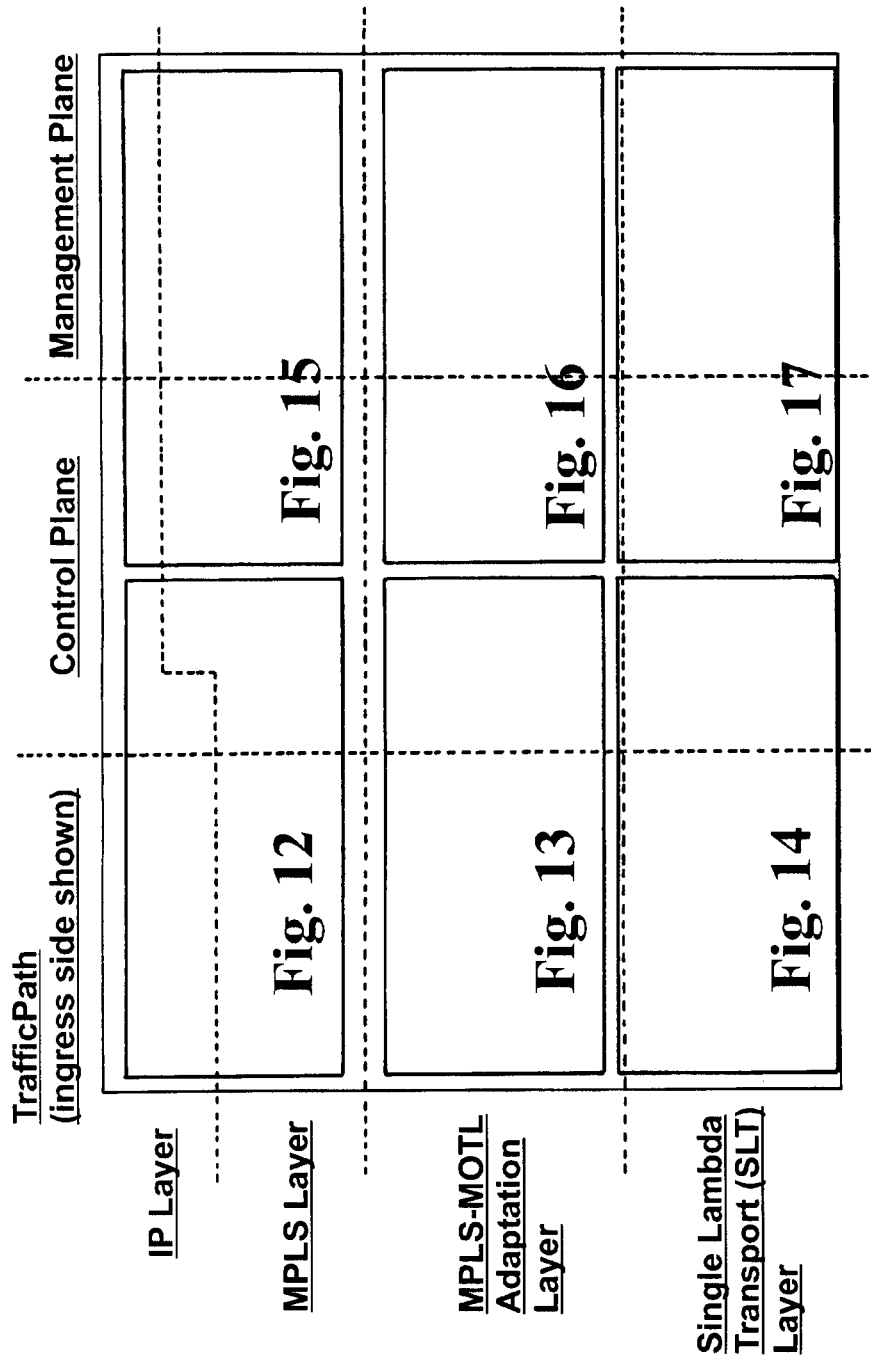
FIG. 11 is a schematic diagram of the network architecture of FIG. 10, and comprises a map showing the interrelationship between FIGS. 12 to 16 below which together constitute the architecture of FIG. 10.

So that each group of objects forming a matrix element and its corresponding interface can be studied in more detail, the following FIGS. 12 to 16 show pairs of elements expanded. FIG. 11 shows the correlation between the general schematic diagram of FIG. 10 and the individual diagrams of FIGS. 12 to 16. The object level functionality of the overall architecture will now be described by below considering these pairs of elements in turn. A top level view of the signalling data paths crossing each major interface is shown in FIGS. 10 and 12 to 17 with the text in italics indicating the semantics of the signalling messages concerned.

Figure 12:
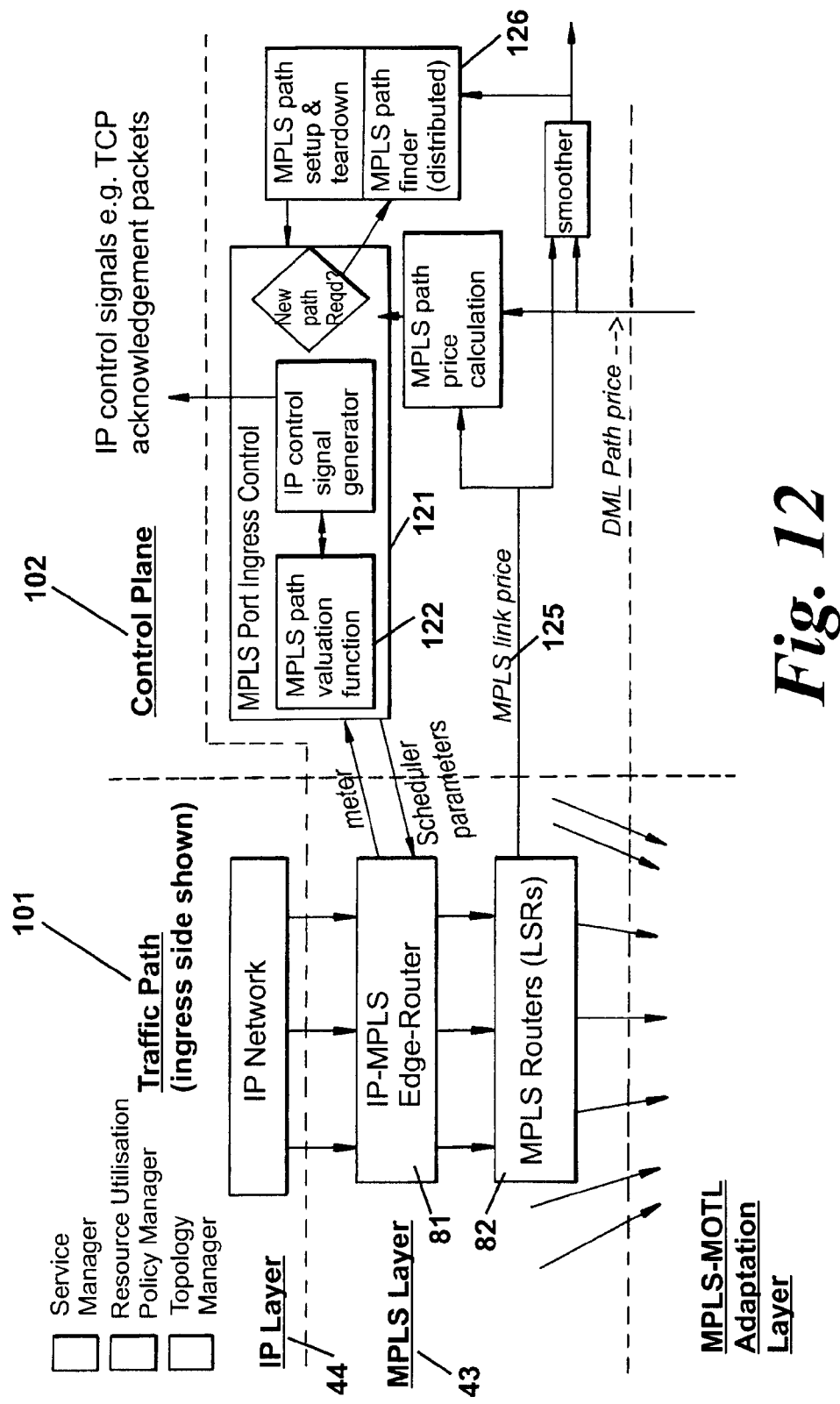
FIG. 12 shows the IP/MPLS traffic path and control plane of the network diagram of FIG. 10.

The ingress half of an end to end traffic path through a four layer network is shown in FIG. 12. The traffic comes across the local IP network from the user hosts (not shown) and enters the IP/MPLS edge router 82 as indicated. It is assumed that a protocol such as Diffserv or appropriate over provisioning will be used in the local ingress IP domain to ensure the QoS of the high priority traffic. In the edge router 82, the ingress traffic is classified and forwarded to the appropriate output port. The high priority traffic is all carried on MPLS RCTs (resource control trails) that span the managed network domain right to the final egress port. The high priority traffic is ingress rate controlled within or before this edge router using whatever ingress control technique is appropriate for the type of traffic concerned. The traffic will then pass through other MPLS capable routers as indicated.

Both the lower priority (ordinary best efforts IP traffic etc.) and all MPLS traffic that is routed onto the core optical network is now directed to an optical layer port on a core router. The diagram of FIG. 11 shows the traffic that is directed to the MOT port at the entrance to a DML path.

The control plane will be described starting at the lower MPLS to MOT port interface. For each DML path a DML path price is fed back up towards MPLS port ingress controller 121. The MPLS layer 43 sees this price as no different from the link prices of all the other MPLS links, and adds the link prices for the end to end MPLS path (LSP) together and feeds the sum back to the MPLS ingress controller.

The MPLS ingress controller 121 contains an MPLS path valuation function 122. This makes use of real time measurements of the per class aggregated traffic rate destined for each LSP to determine a real time maximum price it is prepared to pay for the LSP. This is compared to the current returning MPLS path price. If the path price exceeds the traffic value, then IP control signals are sent to reduce the ingress traffic. Examples of IP signals that rapidly slow down arriving IP traffic are the negative TCP acknowledgement signals that dropping packets in the buffer before the LSP ingress will produce. High LSP price will control inelastic IP traffic streams through signals to the media gateways. Inelastic traffic on a path that has already been admitted continues until the session ends. Inelastic traffic volume can only be controlled slowly by controlling the admission of new sessions. The use of price rather than spare bandwidth enables the optimum ingress control decisions to be made for both elastic and inelastic traffic types on the same LSP. So for instance, new low value CBR connection requests may be turned away because the path has a large volume of high value elastic traffic (such as aggregates of business TCP traffic) using it that is pushing the price high.

The control plane interacts with the traffic plane via a metering interface that measures incoming traffic per class per LSP in close to real-time (e.g. once per second). The scheduler controls the rate at which the traffic is allowed onto each LSP according to the decision of the ingress control function. One form of the scheduler control semantics comprises a signal that continuously adjusts the peak rate of a class based queue (CBQ) scheduler or token bucket queue (TBQ) service rate control function.

Also shown in FIG. 12 is the transmission of MPLS link price information and its addition along an end to end path to form an MPLS path price for the complete MPLS resource controlled trail. The link price is a parameter that increases as the metered volume of high priority MPLS traffic through a particular link ingress port increases above a set control point. A variety of methods are available for sending the link price signals back to the MPLS path ingress controllers. The most scalable is the use of MPLS resource management packets that travel with the data on each LSP, gathering resource utilisation information (e.g. link price) say every second from the ports en-route. The final label edge router extracts these MPLS AM packets and redirects them back to the appropriate ingress controller. The router ports store longer time averages of this dynamically varying link utilisation information for transmission to path finding and routing functions.

If the ingress controller needs to set up a new MPLS path it invokes the MPLS path finder function 125. This function finds new least cost MPLS paths by exploratory signalling messages that flood across particular regions of the network. For scalablity reasons a double ended approach is employed in which a new connection is split into two halves, edge to core and core to edge. Several least cost core to edge routes are found by the egress port controller and the result combined with the ingress controllers view before final choice of route is made.

Figure 13:
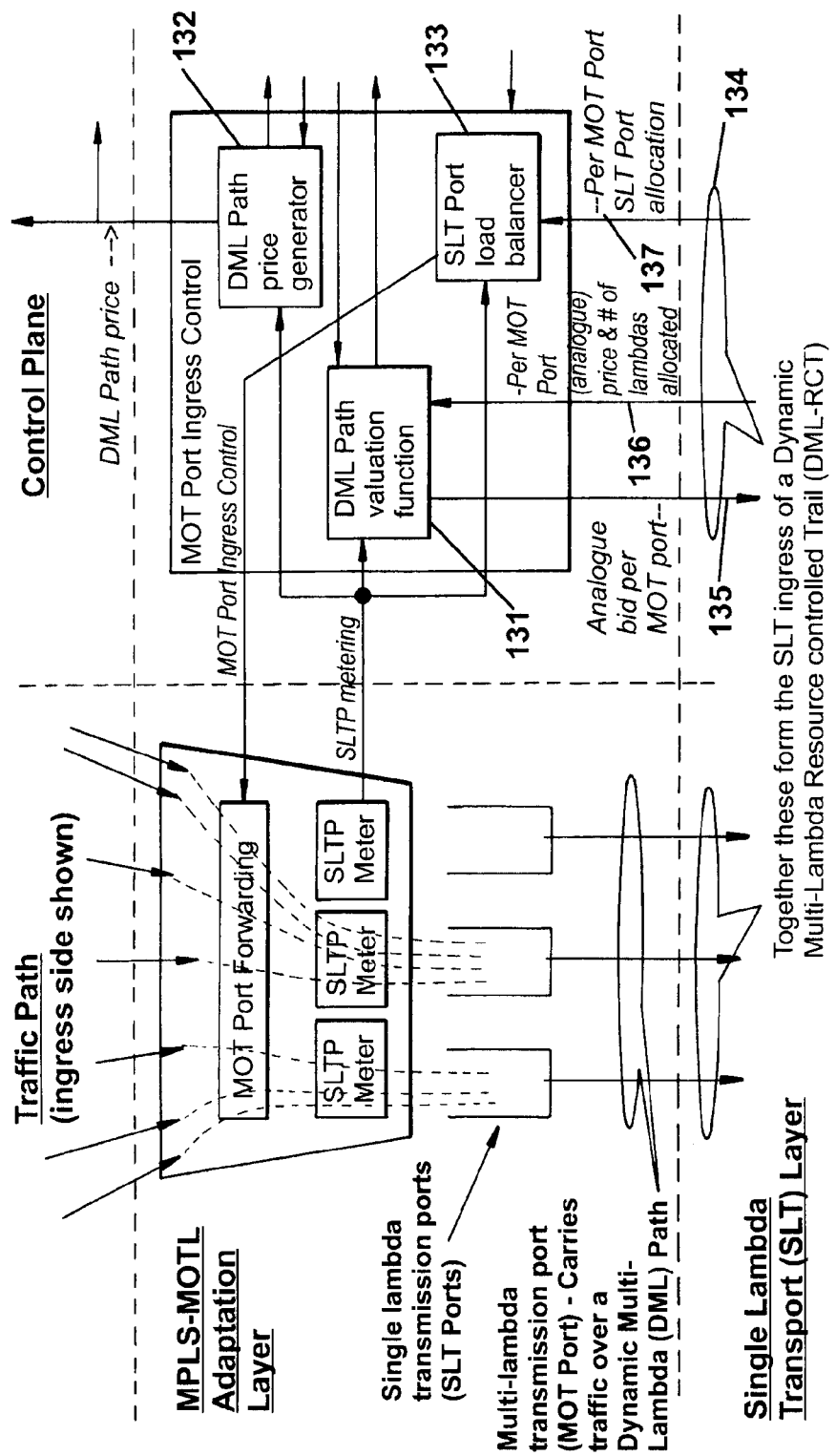
FIG. 13 shows the MPLS to MOT layer traffic path and control plane of the network diagram of FIG. 10.

The basic functionality of the DML-RCT ingress port that is shown in FIG. 13 has been described above. There is however some extra detail shown in the MOT layer port ingress controller and at the control plane interface with the SLT layer. The DML path valuation function 131 uses the aggregate DML port MPLS ingress traffic flow, together with the Current feedback price to deduce its 'analogue bid price' for the DML path. Its calculation is based on a traffic valuation function that includes parameters controlled directly by the supervisory policy control system. So for instance for good network management reasons the DML path valuation function may include a policy that states ' pay whatever the asking price up to a predetermined limit to keep at least one lambda open.' The policy may then state 'as incoming MPLS traffic and DML path price vary control your bids so that over a five minute time scale your income (DML path rate times MPLS path feedback price) approximately equal expenditure on DML path bids to the SLT layer.' This latter policy then couples, with a five minute time constant, increasing congestion in the lambda layer, to increasing prices (and hence reducing incoming flows) at the ingress of the MPLS paths using that particular DML path. This information would also be used in the MPLS layer as a signal that it was worth searching for alternative DML paths.

The DML path price generator 132 is a 'last' price feedback system designed to control unexpected surges in MPLS traffic to guarantee that even in the statistically inevitable surges the peak rate of delay sensitive MPLS traffic does not exceed the DML port service rate. This ensures for instance that not more than one delay sensitive packet in $10^{12}$ is delayed by more than 100 nS per router.

The SLT port load balancer 133 uses the individual aggregates of MPLS flow forwarded by the MOT port forwarding engine into each SLT path ingress buffer. The meter monitors both mean and deviation of flow. The load balancer gradually modifies the forwarding tables of the MOT virtual port to spread the traffic optimally between the SLT ports and ensure that per class QoS guarantees are met. To achieve this it dynamically redirects individual LSPs whilst monitoring the effect on load.

The MOT port ingress controller interface 134 to the SLT layer has three signalling data paths. The analogue bid per port, already described, the returning SLT per DML path price information (also analogue) and total number of lambdas allocated (obviously integer), and the SLT port identifier information appropriate for each MOT port. This is considered the optimal cross layer information to enable automated traffic value based negotiation of resource usage in the lambda layer. The analogue bid is a representation of the optimum bandwidth the MPLS layer would ideally like on the path. It is described as analogue because it is a floating point number with many significant figures of information. This information is fed down into the SLT layer where it is used to carry out the distributed optimisation calculations. The returning 'analogue price' then enables the ingress controller to calculate its currently allocated control analogue bandwidth (simply bid/price). This analogue bandwidth will not in general correspond to an integer multiple of the bandwidth on each wavelength. We prefer to employ a multi phase bidding system that starts with a negotiation phase where the Ingress Ports are allowed to vary the bids under their own control. This is followed by a freeze point after which the ingress controllers have to adjust their bids so that the analogue bandwidth is adjusted within a pre defined tolerance to the nearest integer multiple of the lambda bandwidth. The allocation phase then allocates the new lambda paths in a break before make manner. The integer number of bandwidths is signalled to the DML path valuation function and the precise SLT port configuration information is signalled to the SLT port load balancer. The technique is general and could be applied to the value based optimisation of resource usage of any quantised bandwidth circuit switched network layer.

Figure 14:
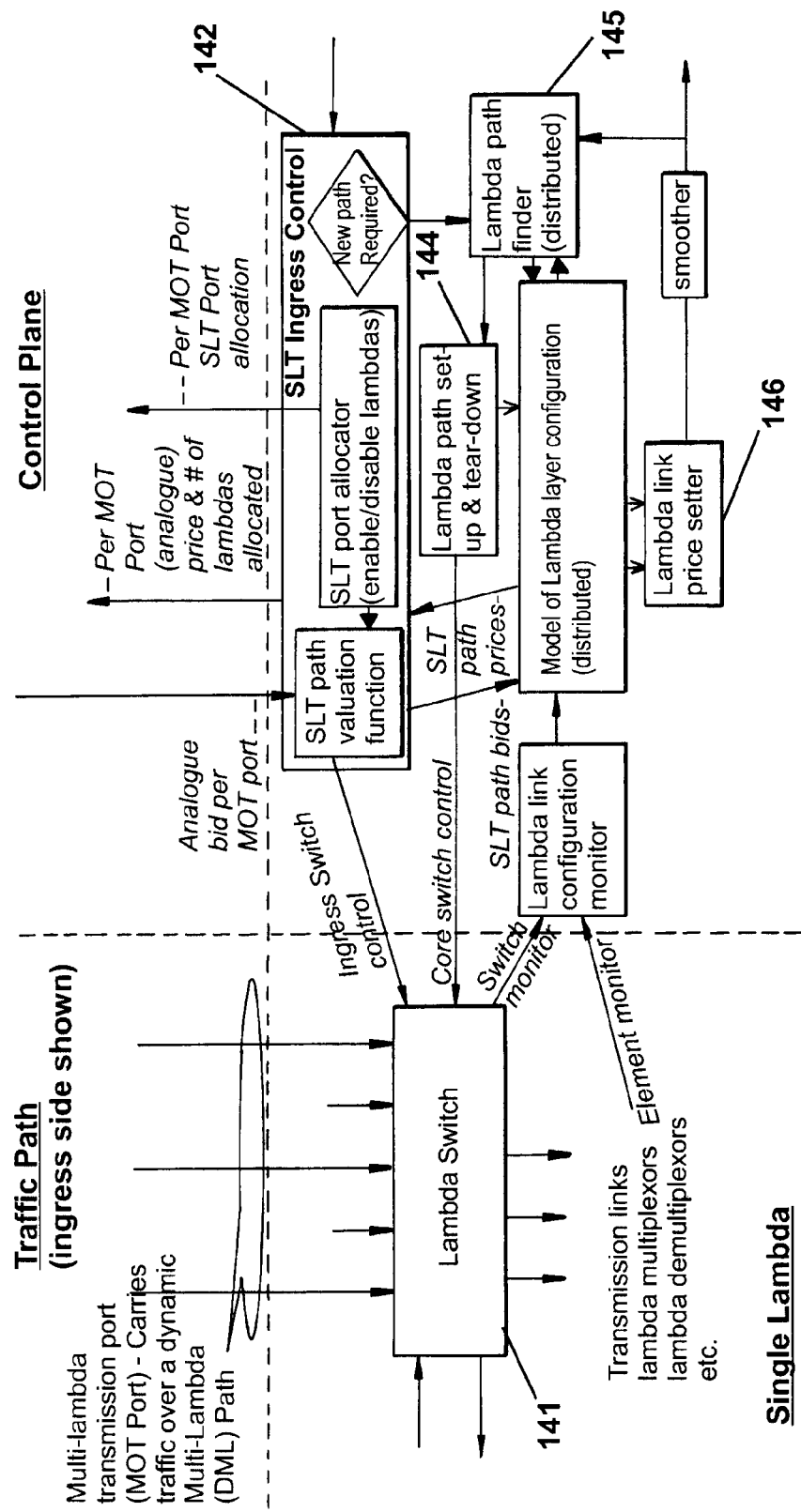
FIG. 14 shows the single lambda transport layer traffic path and control plane of the network diagram of FIG. 10.

Referring now to FIG. 14, the lambda switched or multi-wavelength transport layer consists of lambda switches 141, which may be optoelectronic or photonic, linked by lambda multiplexers, demultiplexers, transmission paths, amplifiers etc. Each of these elements is associated with a local controller that monitors status and controls active components such as switch matrix elements. Out of band control information is carried between the controlled 'Lambda switch nodes'. This could be for instance in the nailed up path overhead of a fixed lambda SDH system, or, as signals modulated directly onto the lambda path using low bandwidth optical intensity modulation of the 'ones' of the optical signal. This allows such basic management as topology discovery and element state determination. In addition the control channel will carry the resource control negotiation signals along each SLT path. Algorithms similar to those already developed for control of the IP/MPLS layer are used for the distributed pricing of each fibre link. This uses a distributed model of the real network that is located in the control plane of the SLT layer. Price of the fibre link will increase as the number of wavelengths in use increases. The use of the separate 'analogue' control plane signalling and the three phase negotiation cycle described above with reference to FIG. 13 allows negotiation for lambdas to proceed independently of the actual lambda allocation until the final phase of each cycle. As described, the system is only resource managing the total number of wavelengths in use on each path. It is assumed that a lower level protocol will then be used at the end of each cycle to pick which precise wavelength is chosen for each path.

Looking in more detail at the control plane, the SLT ingress control 142 is capable of the final stage of adaptation from the MPLS to multi lambda adaptation layer. Other simpler types of SLT port would be capable of carrying for instance multiple SDH traffic flows, perhaps over diverse protection switched lambda paths, or simpler still over a single wavelength path.

In this case, the SLT ingress port takes the total analogue bid per MOT port and splits the bid amongst a set of lambda switched paths, It has its own traffic valuation function and applies its own policies that isolate short-term fluctuations in SLT path price from the MPLS-MOT adaptation layer. When the SLT ingress controller 142 finds it does not have an appropriate lambda path to send ingress traffic down, or it needs to add a lambda to a DML path, then it requests a new path from the distributed lambda path finder 145. This discovers new least cost lambda paths by sending discovery messages through the control plane model of the lambda network.

In extremely large scale lambda networks, this may require a semi-hierarchical, double ended approach as advocated by the CSIP team for MPLS path finding.

This type of rapid, distributed control plane based routing is fast and scalable, but does not always lead to the globally optimum routing of the traffic. The more centralised, and hence slower, path advisor function of the management plane monitors routing and traffic loading, carries out more sophisticated routing algorithms and advises the ingress controllers of improvements in routing that can be made. It also advises the ingress controller it the distributed algorithms fail to find an appropriate path for a new request.

Once a new SLT path is found in the control plane, the lambda path set-up and tear down functional unit 144 is informed, and the appropriate switch positions are changed. The SLT ingress controller 141 is then informed. The ingress controller sets the final ingress control switch and signals the MOT layer of the new SLT path, its price, and the port allocation details.

The lambda link price setter 146 shown in the figure sets a price for each fibre link. This price increases rapidly as the number of wavelengths in use on the link increases. In this way new lambda paths will always be chosen in the least heavily loaded fibres. The low value paths may be used by routers on an opportunist basis recognising that these paths can be interrupted or re-routed at the will of the high value paths.

Note that as in the MPLS layer, the link price information is smoothed before sending to the more global path advisor, both to reduce information rate (for scalability reasons) and because the more global path advisor function should not respond to minor short term fluctuations in link loading.

Figure 15:
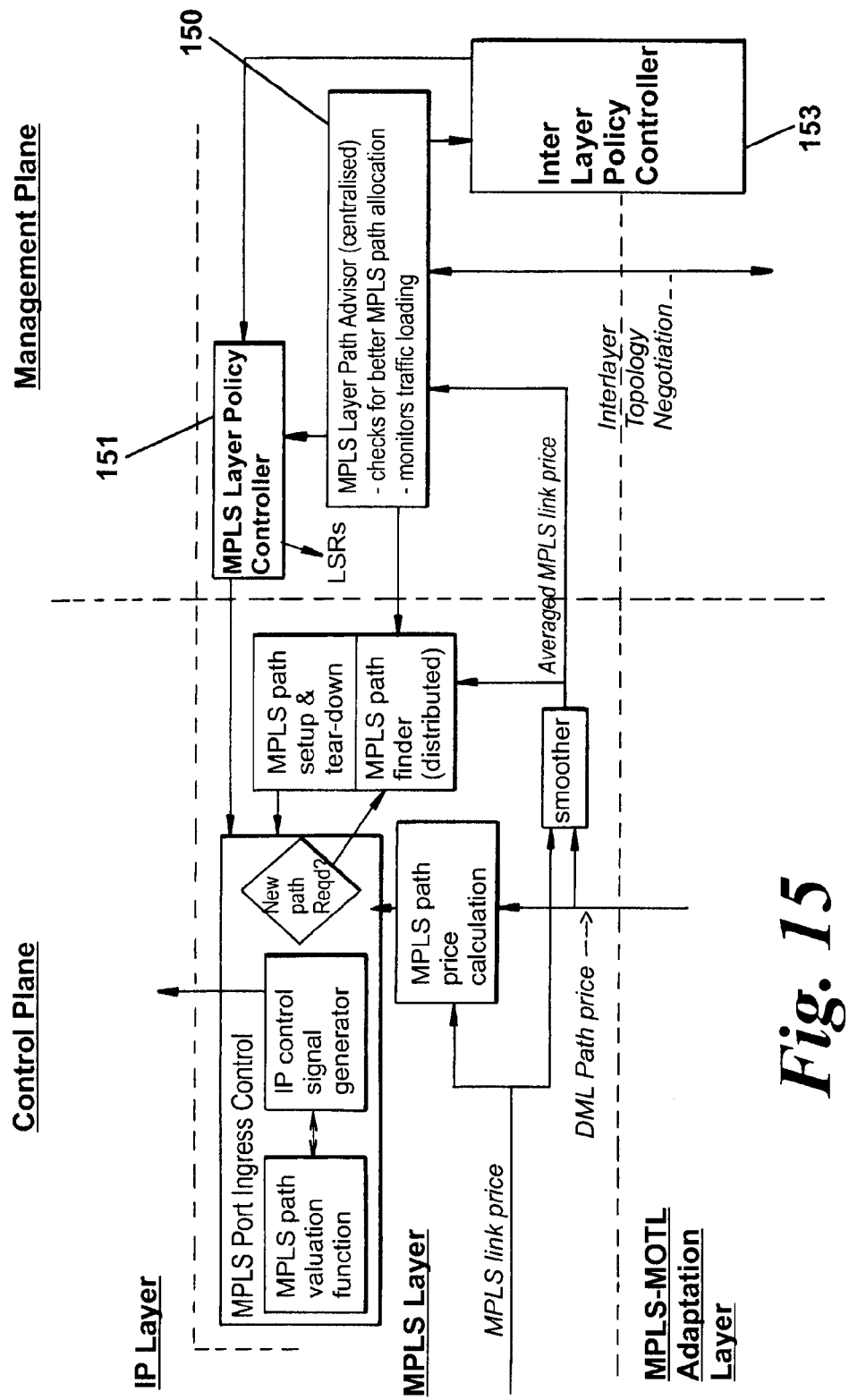
FIG. 15 shows the control and management planes of the network diagram of FIG. 10.

FIG. 15 shows the control and management plane of the IP/MPLS layer of the overall architecture. The path advisor 150 has a 'global' view of the MPLS paths in the managed network. It includes algorithms capable of finding closer to optimal least cost paths than the distributed path finders of the control plane. It also has a global view of the congestion situation and is able to advise the MPLS Layer policy controller 151 when congestion is not being adequately controlled to meet QoS guarantees. The controller 151 instructs the ingress controllers or other network elements to make suitable changes in control policy to relieve the congestion. For instance adjusting the parameter that sets the way ingress controllers value incoming TCP traffic so as to decrease its measured value has an immediate congestion relieving effect. A similar effect can be achieved by adjusting the parameters that control the way router ports set MPLS link price in such a way as to increase prices for the same metered throughput.

Figure 16:
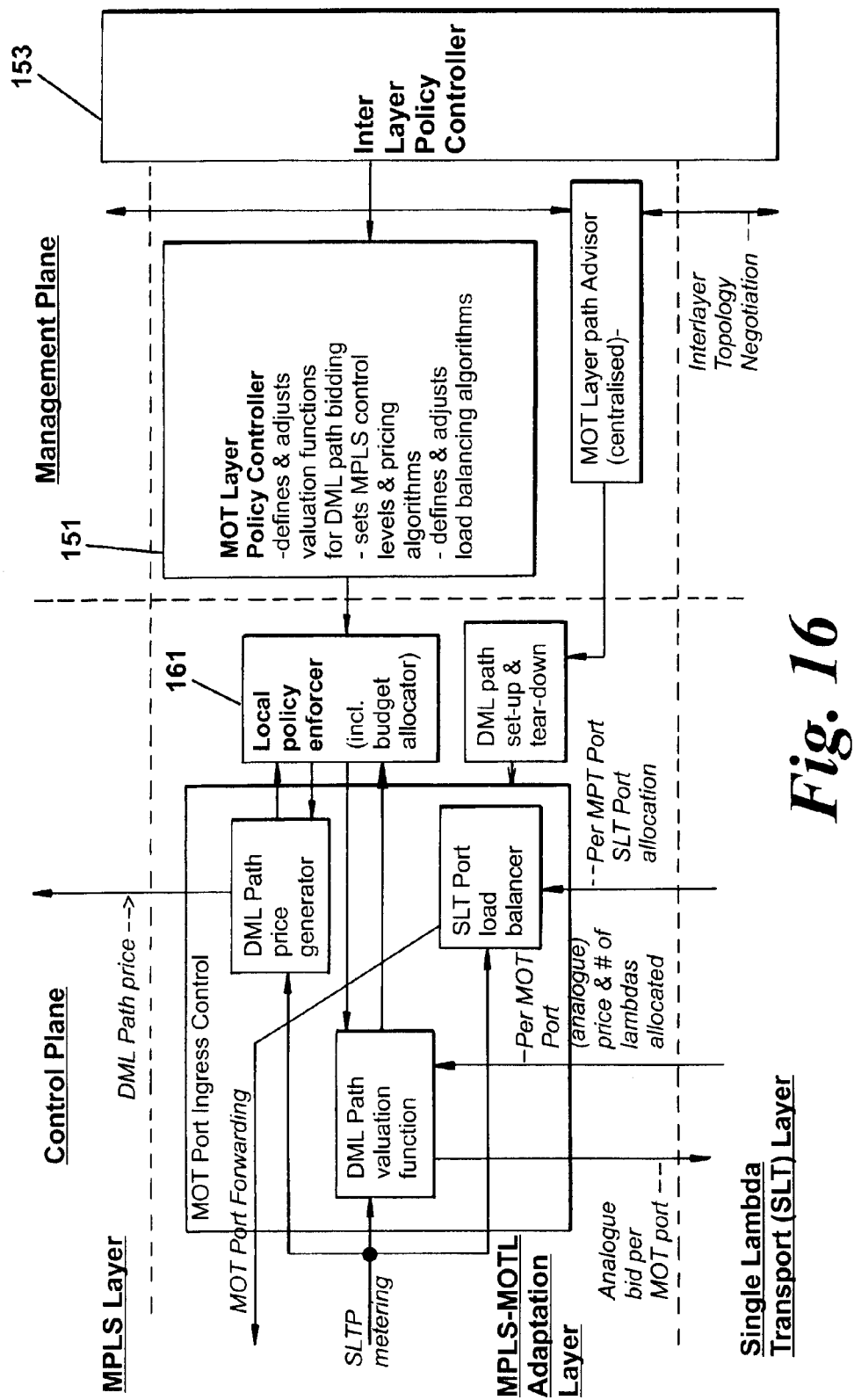
FIG. 16 shows the MOT layer control and management planes of the network diagram of FIG. 10.
Figure 17:
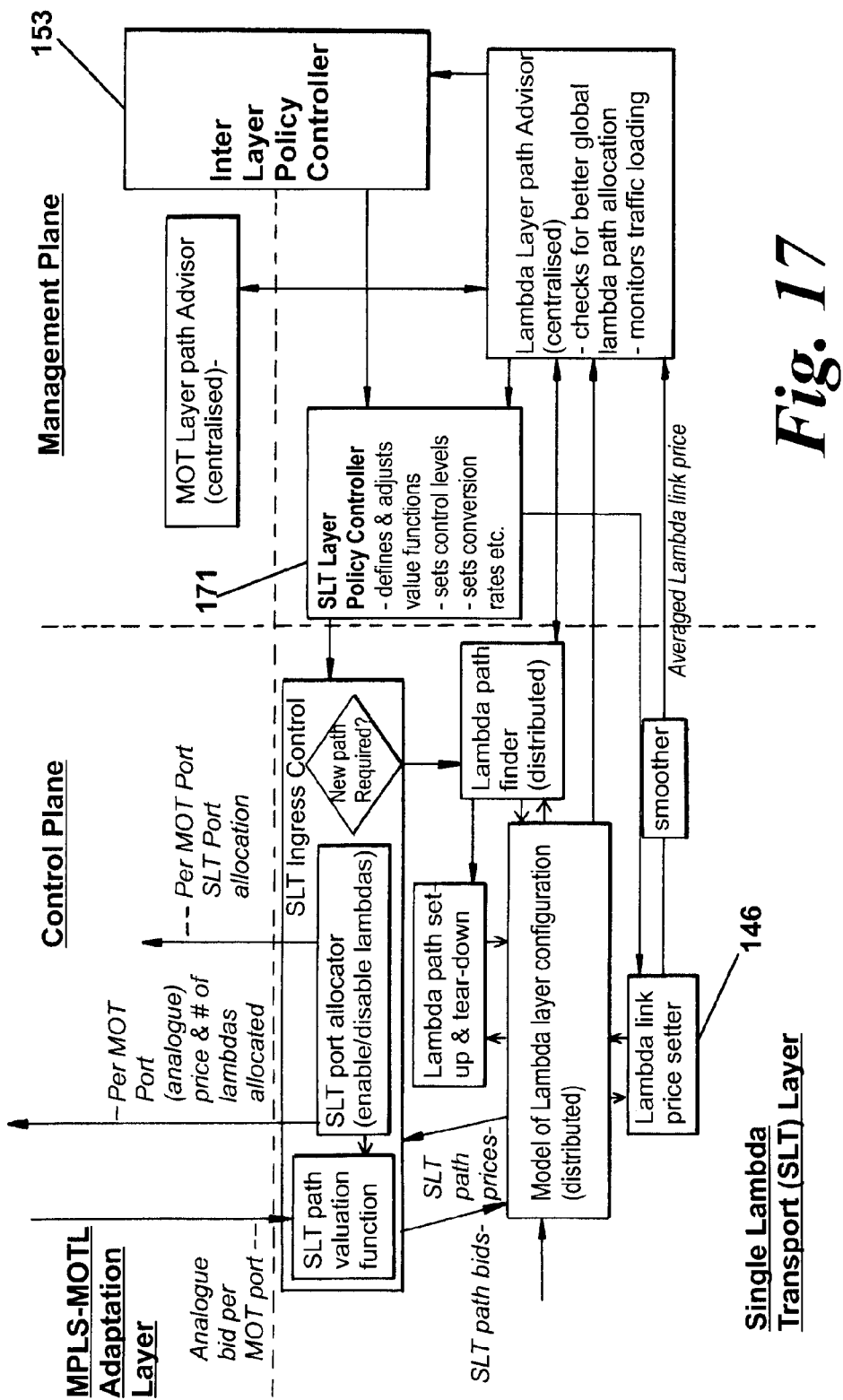
FIG. 17 shows SLT layer policy controller of the network of FIG. 10.

Whilst the MPLS layer policy controller 151 just described is purely an intra layer functionality, the interlayer policy controller 153 (FIGS. 16 and 17) is responsible for controlling resource usage between the layers. By taking a global view of resource utilisaton between layers by comparing information from each layer's path advisors, the inter layer policy manager 153 adjusts pricing policies between layers in such away as to optimise relative use of each layer. So for instance if the IP/MPLS layer is consistently congested whilst there are still many spare high value SLT paths in the optical layer, the interlayer manager 153 alters the effective 'exchange rate' between the layers to give the IP layer more buying power. This can be achieved by increasing the 'exchange rate' in the DML path valuation function of the MOT to MPLS adaptation layer. This is done by the inter layer policy controller instructing the MOT layer policy controller 151 (FIG. 16). This instruction is then sent to the local policy enforcement function 161 in each network element that controls the value assigned to metered incoming MPLS traffic. Alternatively lambda link prices can be reduced by policy control instructions sent to the lambda link price setter 146 (FIG. 17). This latter policy differs from the former in that it encourages an increase In traffic in the SLT layer from all sources, not just the MPLS layer. It is the job of the SLT layer policy controller 171 (FIG. 17) to decide which of these two policies to adopt and to co-ordinate via the interlayer policy manager 153 with the MOT layer policy controller 151 (FIG. 16).

Any range or device value given herein may be extended or altered without losing the effect sought, as will be apparent to the skilled person for an understanding of the teachings herein.

The invention claimed is:

1. A method of allocating resources in a network having multiple resource-allocation transport layers and in which a first transport layer requires resources provided by a second of said transport layers, the method comprising the steps of:
   providing an indication, from said first transport layer to the second transport layer, of said required resources to be allocated from said second transport layer;
   automatically offering, at said second transport layer, said required resource together with a condition for use of those resources; and
   determining, at said first transport layer, if the condition for use of the offered resources is acceptable and, if so, automatically accepting the offered resources from the second transport layer.

2. A method as claimed in claim 1, wherein said condition includes a price for use of said offered resources.

3. A method according to claim 2 additionally comprising the step of:
   varying said price responsive to said request and to availability of said resources.

4. A method as claimed in claim 3, wherein said network incorporates a multi-wavelength transport layer.

5. A method as claimed in claim 4, wherein traffic ingress to said multi-wavelength transport layer is controlled via a virtual port.

6. A method as claimed in claim 5, wherein said virtual port provides access to a plurality of real ports one for each wavelength transported on the multi-wavelength transport layer.

7. A method as claimed in claim 6, wherein said virtual port distributes traffic to said real ports so as to balance the loading of the real ports.

8. A method as claimed in claim 7, wherein an ingress control of said virtual port advertises an ingress access price for bandwidth use in the multi-wavelength transport layer.

9. A method as claimed in claim 8, wherein the ingress control of said virtual port allocates ingress traffic to one or more individual wavelengths in the multi-wavelength transport layer according to a current bandwidth price for access to the multi-wavelength transport layer.

10. A method as claimed in claim 9, wherein said multi-wavelength transport layer provides supertrunks between ingress and egress ports.

11. A method according to claim 1 wherein said acceptability is determined by said first transport layer according to a pre-determined allocation policy.

12. A method according to claim 11 additionally comprising the step of:
   monitoring a characteristic effect of said allocation policy;
   varying said allocation policy responsive to said characteristic.

13. A method of allocating resources in a communications network having a hierarchy of transport layers, each said transport layer having its own resource capacity, the method comprising; determining within said transport layer whether that transport layer has sufficient resources to support a request for service, and, where that transport layer has insufficient resources to support a request for service, automatically requesting further resources from one or more other said transport layers, wherein a demand oriented price for requested resource use is determined by each said transport layer, and wherein said price is offered by that layer to any other layer requesting use of that resource.

14. A method as claimed in claim 13, wherein allocation of resources from one transport layer to another is determined by a customer willingness to pay the current price for those resources.

15. A method as claimed in claim 14 wherein the network resources are allocated so as to provide substantially uniform resource use both horizontally across each said transport layer and vertically over said hierarchy of transport layers.

16. A method of managing a communications network having a multi-layer hierarchical transport structure having a hierarchy of transport layers in which each transport layer of the hierarchy can provide a transport service to one or more other layers of the network, the method comprising negotiating between said transport layers to determine a network resource allocation and a resource price to be offered to a customer for admission to the network and utilization of said resource allocation.

17. A method as claimed in claim 16, wherein a demand oriented price for requested resource use is determined by each said transport layer, and wherein said price is offered by that transport layer to any other layer of the network requesting use of that resource.

18. A method of managing a communications network having a multi-layer hierarchical transport structure having a hierarchy of transport layers in which each transport layer of the hierarchy can provide a transport service to one or more other layers of the network, the method comprising negotiating automatically between said transport layers to determine a network resource allocation and a resource price to be offered to a customer for admission to the network and utilisation by the customer of said resource allocation.

19. A communications network having a multi-layer hierarchical transport structure having a hierarchy of transport layers in which each transport layer of the hierarchy can provide a transport service to one or more other layers of the network, and having a management arrangement for negotiating automatically between said transport layers to determine a network resource allocation and a resource price to be offered to a customer for admission to the network and utilisation by the customer of said resource allocation.

20. A layered resource-allocation transport system comprising:
   a first transport layer comprising a topology manager arranged to provide an indication of resources required by the first transport layer and an indication of willingness to pay for said required resources;
   a second transport layer comprising a service manager arranged to provide said resources responsive to a comparison between said willingness to pay and a price of said required resources.

21. A communications network having multiple resource-allocation transport layers and incorporating a management structure for allocating resources to allocate resources requested by a first transport layer of said transport layers from a second of said transport layers, the management structure being arranged to:
   at said first transport layer, provide an indication to the second transport layer of said required resources to be allocated from said second transport layer;
   at said second transport layer automatically offer said required resource together with a condition for use of those resources; and
   at said first transport layer determine if the condition for use of the offered resources is acceptable and, if so, automatically accept the offered resources from the second layer.

22. A communications network having multiple resource-allocation transport layers and incorporating a resource allocation management structure for allocating requested resources between said transport layers, one of said multiple resource-allocation transport layers being a multi-wavelength transport layer to which controlled access is provided via one or more virtual ports, wherein each said virtual port provides access to a plurality of real ports one for each wavelength transported on the multi-wavelength transport layer, and wherein said virtual port distributes traffic to said real ports so as to balance the loading of the real ports.

23. A network as claimed in claim 22, wherein an ingress control of said virtual port advertises an ingress access price for bandwidth use in the multi-wavelength transport layer.

24. A network as claimed in claim 23, wherein the ingress control of said virtual port allocates ingress traffic to one or more individual wavelengths in the multi-wavelength transport layer according to a current bandwidth price for access to the multi-wavelength transport layer.

25. A network as claimed in claim 24, wherein said multi-wavelength transport layer provides supertrunks between ingress and egress ports.

26. A multi-layer communications network, comprising an upper Internet protocol (IP) layer, a multi-protocol label switched (MPLS) layer, a synchronous transport (SDH) layer, and an underlying multi-wavelength optical transport layer, wherein each said layer has a respective manager arranged to manage resources within that layer, to respond to requests for service from other layer managers, to set a price for those service requests, and to request service from the other layer managers, and wherein an interlayer manager responsible for controlling the resource allocation and resource pricing of each said layer manager so as to optimize use of the resources within each said layer.

27. A network as claimed in claim 26, wherein traffic ingress to said multi-wavelength transport layer is controlled via a virtual port.

28. A network as claimed in claim 27, wherein said virtual port provides access to a plurality of real ports one for each wavelength transported on the multi-wavelength transport layer.

29. A network as claimed in claim 28, wherein said virtual port distributes traffic to said real ports so as to balance the loading of the real ports.

30. A network as claimed in claim 29, wherein an ingress control of said virtual port allocates ingress traffic to one or more individual wavelengths in the multi-wavelength transport layer according to a current bandwidth price for access to the multi-wavelength transport layer.

31. A network as claimed in claim 30, wherein said multi-wavelength transport layer provides supertrunks between ingress and egress ports.

32. A computer readable medium encoded with software for allocating resources in a communications network having a hierarchy of transport layers each said transport layer having its own resource capacity, the software being arranged to perform the method of; determining within said transport layer whether that transport layer has sufficient resources to support a request for service, and where that transport layer has insufficient resources to support a request for service, automatically requesting further resources from one or more other said transport layers, wherein the software is arranged to determine a demand oriented price for requested resource use for each said transport layer, and wherein the software is arranged to offer said price on behalf of that layer to any other layer requesting use of that resource.

* * * * *